(12) United States Patent
Kishi

(10) Patent No.: US 8,457,420 B2
(45) Date of Patent: Jun. 4, 2013

(54) IMAGE DECODING APPARATUS FOR DECODING IMAGE DATA ENCODED BY A METHOD DESIGNATING WHETHER TO PERFORM DISTORTION SUPPRESSION PROCESSING AND CONTROL METHOD FOR THE SAME

(75) Inventor: Hiroki Kishi, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 518 days.

(21) Appl. No.: 12/785,545

(22) Filed: May 24, 2010

(65) Prior Publication Data

US 2010/0316304 A1    Dec. 16, 2010

(30) Foreign Application Priority Data

Jun. 16, 2009    (JP) .................................. 2009-143667

(51) Int. Cl.
*G06K 9/36* (2006.01)
(52) U.S. Cl.
USPC .......................................... 382/233; 382/239
(58) Field of Classification Search
None
See application file for complete search history.

(56) References Cited

U.S. PATENT DOCUMENTS

| | | | | |
|---|---|---|---|---|
| 5,227,789 | A * | 7/1993 | Barry et al. ...................... | 341/65 |
| 5,802,213 | A * | 9/1998 | Gardos ........................... | 382/239 |
| 6,175,596 | B1 * | 1/2001 | Kobayashi et al. ....... | 375/240.27 |
| 6,185,340 | B1 * | 2/2001 | Comer .......................... | 382/236 |
| 6,427,027 | B1 * | 7/2002 | Suzuki et al. ................. | 382/236 |
| 6,549,676 | B1 | 4/2003 | Nakayama et al. ........... | 382/246 |
| 6,560,365 | B1 | 5/2003 | Nakayama et al. ........... | 382/233 |
| 6,567,562 | B1 | 5/2003 | Nakayama et al. ........... | 382/246 |
| 6,600,835 | B1 | 7/2003 | Ishikawa ....................... | 382/236 |
| 6,711,295 | B2 | 3/2004 | Nakayama et al. ........... | 382/232 |
| 6,768,819 | B2 | 7/2004 | Yamazaki et al. ............ | 382/240 |
| 6,847,735 | B2 | 1/2005 | Kajiwara et al. .............. | 382/233 |
| 6,879,726 | B2 | 4/2005 | Sato et al. ..................... | 382/239 |
| 6,879,727 | B2 | 4/2005 | Sato et al. ..................... | 382/239 |
| 6,917,716 | B2 | 7/2005 | Kajiwara et al. .............. | 382/240 |
| 6,947,600 | B1 | 9/2005 | Sato et al. ..................... | 382/233 |
| 6,950,471 | B2 | 9/2005 | Kishi ....................... | 375/240.19 |
| 6,993,198 | B2 | 1/2006 | Kishi ............................ | 382/240 |
| 7,258,669 | B2 | 8/2007 | Russell ......................... | 600/458 |
| 7,305,139 | B2 * | 12/2007 | Srinivasan et al. ........... | 382/248 |
| 7,428,342 | B2 * | 9/2008 | Tu et al. ........................ | 382/248 |
| 7,454,075 | B2 | 11/2008 | Fukuhara et al. ............. | 382/240 |
| 7,483,581 | B2 | 1/2009 | Raveendran et al. ......... | 382/236 |
| 7,499,592 | B2 | 3/2009 | Nakayama et al. ........... | 382/233 |

(Continued)

FOREIGN PATENT DOCUMENTS

JP    2006-197573 A    7/2006

OTHER PUBLICATIONS

Office Action dated Jul. 26, 2011, in U.S. Appl. No. 12/412,002.
Office Action dated Jul. 15, 2011, in U.S. Appl. No. 12/411,992.

(Continued)

*Primary Examiner* — Wenpeng Chen
(74) *Attorney, Agent, or Firm* — Fitzpatrick, Cella, Harper & Scinto

(57) ABSTRACT

This invention provides a technique to turn off a distortion suppression function within the range in which image quality degradation is allowed, in order to increase the processing speed at the time of decoding. For this purpose, an apparatus of the invention rewrites parameter information in a header with information indicating that no distortion suppression processing has been performed, and decodes encoded image data including the rewritten header, when the header contains parameter information indicating that the distortion suppression processing has been performed only before the first frequency conversion.

8 Claims, 24 Drawing Sheets

U.S. PATENT DOCUMENTS

| | | |
|---|---|---|
| 7,551,789 B2 * | 6/2009 | Tu et al. .................. 382/248 |
| 7,574,063 B2 | 8/2009 | Kajiwara et al. ............. 382/239 |
| 7,630,576 B2 * | 12/2009 | Kondo ..................... 382/276 |
| 7,663,779 B2 * | 2/2010 | Nagao et al. ................ 358/1.2 |
| 7,715,637 B2 | 5/2010 | Kishi ...................... 382/232 |
| 7,715,648 B2 * | 5/2010 | Bae et al. .................. 382/268 |
| 7,751,478 B2 * | 7/2010 | Kim et al. ................ 375/240.12 |
| 7,925,097 B2 | 4/2011 | Tarumoto et al. ............. 382/232 |
| 7,991,237 B2 * | 8/2011 | Sekiguchi et al. ............ 382/238 |
| 8,094,726 B2 * | 1/2012 | Kishi et al. ............... 375/240.24 |
| 8,184,711 B2 * | 5/2012 | Horiuchi et al. ........... 375/240.18 |
| 8,204,342 B2 * | 6/2012 | Tani et al. ................. 382/307 |
| 8,218,648 B2 * | 7/2012 | Kishi et al. ............... 375/240.24 |
| 8,275,209 B2 * | 9/2012 | Schonberg et al. ............ 382/233 |
| 2002/0136295 A1 * | 9/2002 | Sato ..................... 375/240.03 |
| 2004/0028282 A1 * | 2/2004 | Kato et al. ................. 382/236 |
| 2004/0032968 A1 * | 2/2004 | Andrew et al. ............... 382/100 |
| 2005/0135484 A1 * | 6/2005 | Lee et al. ................ 375/240.16 |
| 2005/0265608 A1 * | 12/2005 | Suino ..................... 382/233 |
| 2006/0133684 A1 * | 6/2006 | Srinivasan et al. ............ 382/250 |
| 2007/0160299 A1 | 7/2007 | Kajiwara et al. ............. 382/240 |
| 2007/0171978 A1 * | 7/2007 | Chono .................. 375/240.18 |
| 2007/0286478 A1 * | 12/2007 | Kishi ...................... 382/162 |
| 2008/0089413 A1 * | 4/2008 | Kishi et al. ............... 375/240.13 |
| 2008/0107403 A1 * | 5/2008 | Urano ..................... 386/124 |
| 2009/0003717 A1 * | 1/2009 | Sekiguchi et al. ............ 382/238 |
| 2009/0252232 A1 * | 10/2009 | Kishi et al. ............... 375/240.24 |
| 2009/0252427 A1 * | 10/2009 | Kishi et al. ................ 382/244 |
| 2009/0285498 A1 * | 11/2009 | Sakuyama .................. 382/233 |
| 2009/0297054 A1 * | 12/2009 | Regunathan et al. .......... 382/248 |
| 2010/0034478 A1 | 2/2010 | Kajiwara et al. ............. 382/248 |
| 2010/0067810 A1 | 3/2010 | Kishi ...................... 382/232 |
| 2010/0086223 A1 * | 4/2010 | Daian et al. ................ 382/233 |
| 2010/0316303 A1 | 12/2010 | Kishi ...................... 382/233 |

OTHER PUBLICATIONS

Hara, J., "Current report of standardization for the JPEG XR image compression", The Journal of the Institute of Image Electronics Engineers of Japan, vol. 37, No. 4, Jul. 25, 2008, pp. 502-512 (with translation).

"JPEG XR Leads to 8-Bit Tone Ultra Camera", 2008 Nikkei Electronics, Dec. 29, 2008, pp. 71-77.

* cited by examiner

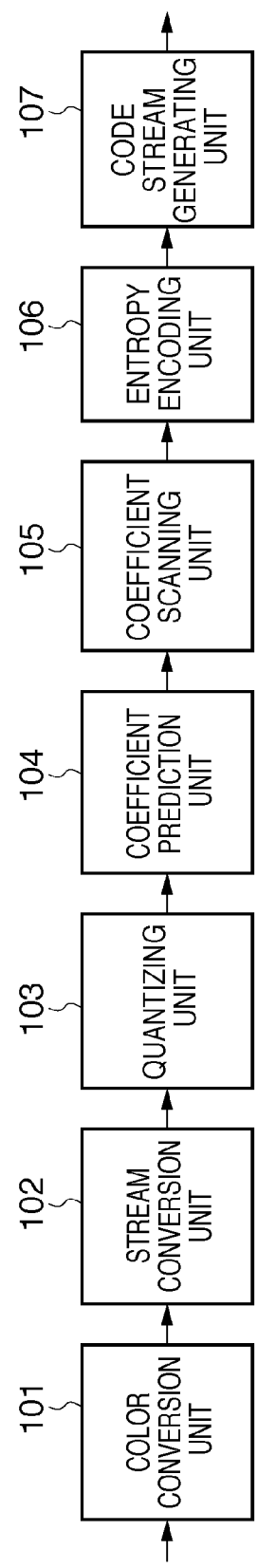
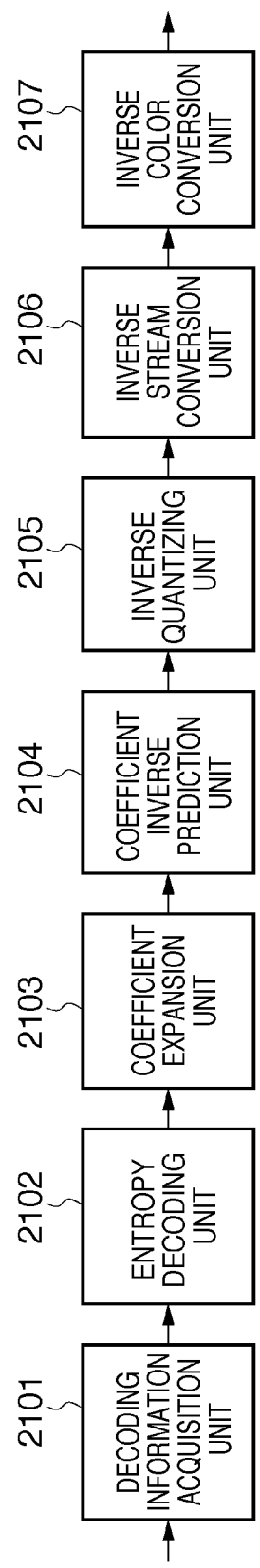

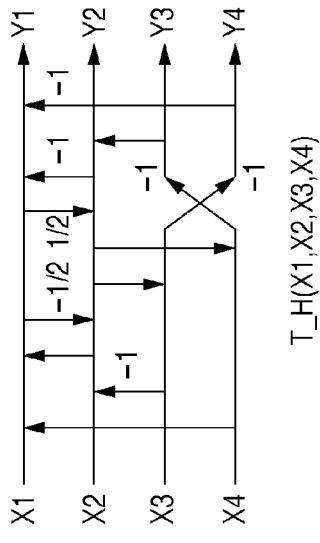
FIG. 7A
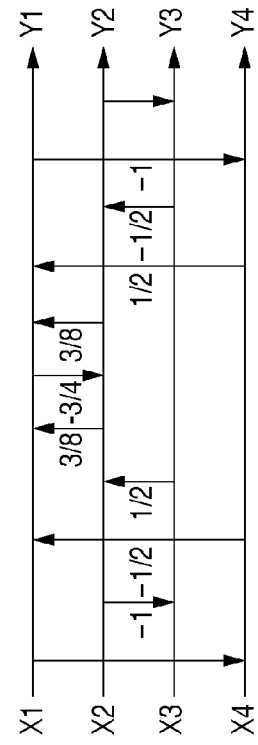
FIG. 7B
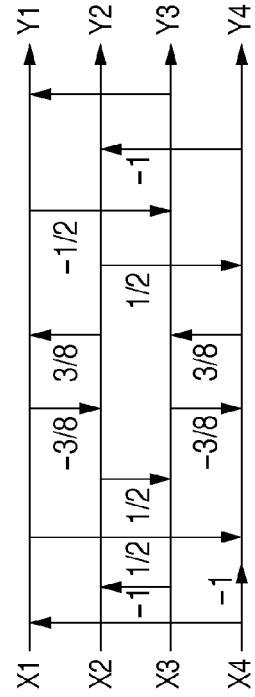
FIG. 7C
FIG. 7D

|   |   |   |   |   |   |
|---|---|---|---|---|---|
|   |   | D | T |   |   |
|   |   | L | X |   |   |
|   |   |   |   |   |   |

FIG. 11

|   | 1 | 2 | 3 |
|---|---|---|---|
| 4 | 5 | 6 | 7 |
| 8 | 9 | 10 | 11 |
| 12 | 13 | 14 | 15 |

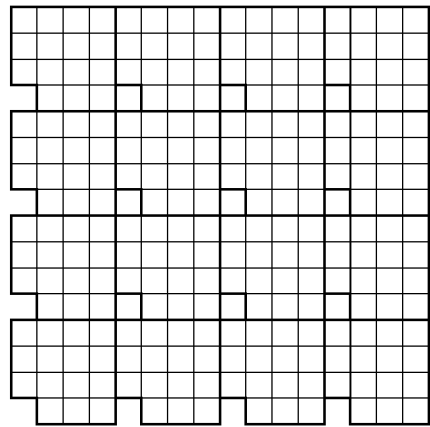
FIG. 13C
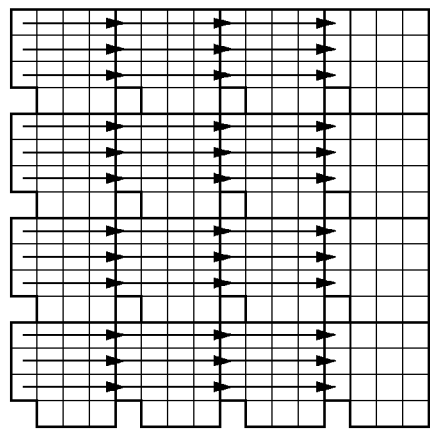
FIG. 13B
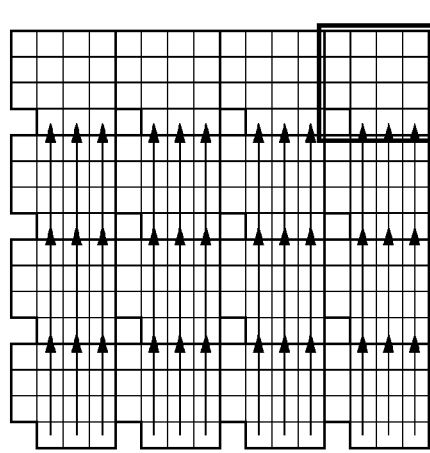
FIG. 13A
FIG. 13D

IMAGE DECODING APPARATUS FOR DECODING IMAGE DATA ENCODED BY A METHOD DESIGNATING WHETHER TO PERFORM DISTORTION SUPPRESSION PROCESSING AND CONTROL METHOD FOR THE SAME

BACKGROUND OF THE INVENTION

1. Field of the Invention

The present invention relates to a decoding technique for encoded image data.

2. Description of the Related Art

An encoding technique for image compression for a reduction in file size is indispensable for efficiently storing, managing, and transferring digital images. In general, when image data is to be encoded, the image is divided into several blocks, and encoding processing is performed on a block basis. When encoding is performed on a block basis, block boundaries tend to distort. Under the circumstance, an encoding technique that suppresses distortion at block boundaries is known (for example, Japanese Patent Laid-Open No. 2006-197573 to be referred to as reference 1 hereinafter). The technique disclosed in reference 1 divides an image into tiles. The technique then generates hierarchical stream data by repeating DCT for each tile. In order to suppress block distortion that occurs between tiles, this technique performs predetermined processing by using the pixels of two adjacent tiles before the execution of DCT or in the process of executing DCT. As such encoding processing, JPEG XR is known (e.g., "Current report of standardization for the JPEG XR image compression", The Journal of The Institute of Image Electronics Engineers of Japan, Vol. 37, No. 4, pp. 502-512, issued Jul. 25, 2008, and 2008 Nikkei Electronics, pp. 71-77, issued Dec. 29, 2008).

Processes based on the above technique include the processing of suppressing block distortion in the process of performing stream conversion processing. The user can select a process of his choice from these processes. Although this function can suppress distortion, the calculation cost for stream conversion processing increases double or more. The function of suppressing distortion includes processes in encoding processing and decoding processing that are designed to be performed in pair. That is, when a process has been performed at the time of encoding, a corresponding process is automatically performed at the time of decoding. A decoding apparatus, which decodes data encoded upon distortion suppression, always needs to perform a process corresponding to distortion processing, resulting in a delay in display, no matter how the user wants to display the data at high speed.

SUMMARY OF THE INVENTION

The present invention provides a technique of turning off a distortion suppression function within the range in which image quality degradation is allowed, in order to increase the processing speed at the time of decoding.

In order to solve this problem, for example, an image decoding apparatus according to the present invention includes the following arrangement. That is, there is provided an image decoding apparatus which decodes encoded image data encoded by an encoding method configured to designate whether to perform distortion suppression processing of suppressing block distortion before each of two times of frequency conversion, the apparatus comprising: a decoding unit which decodes target encoded image data based on information included in a header of the encoded image data; a designation unit which designates whether to perform high-speed decoding; an analysis unit which analyzes a header of decoding target encoded image data and extracts parameter information associated with the distortion suppression processing; and a header information changing unit which rewrites the parameter information in the header with information indicating no execution of the distortion suppression processing and supplies the encoded image data including the rewritten header to the decoding unit when the parameter information obtained by the analysis unit indicates that the distortion suppression processing has been performed only before first frequency conversion and the designation unit has designated high-speed decoding.

According to the present invention, it is possible to speed up decoding processing while suppressing image quality degradation within an allowable range.

Further features of the present invention will become apparent from the following description of exemplary embodiments (with reference to the attached drawings).

BRIEF DESCRIPTION OF THE DRAWINGS

FIGS. 1A and 1B are block diagrams of an image compression unit and decompression unit;

FIGS. 7A to 7D are views showing the pixel positions in a block in frequency conversion processing and the structure of three filters;

FIG. 11 is a view showing the data arrangement of process target blocks of low-pass component prediction;

FIGS. 13A to 13D are views showing the relationship between the scanning direction and the data arrangement of process target blocks of low-pass component prediction;

DESCRIPTION OF THE EMBODIMENTS

The embodiments of the present invention will be described in detail below with reference to the accompanying drawings.

[First Embodiment]

Figure 22A:
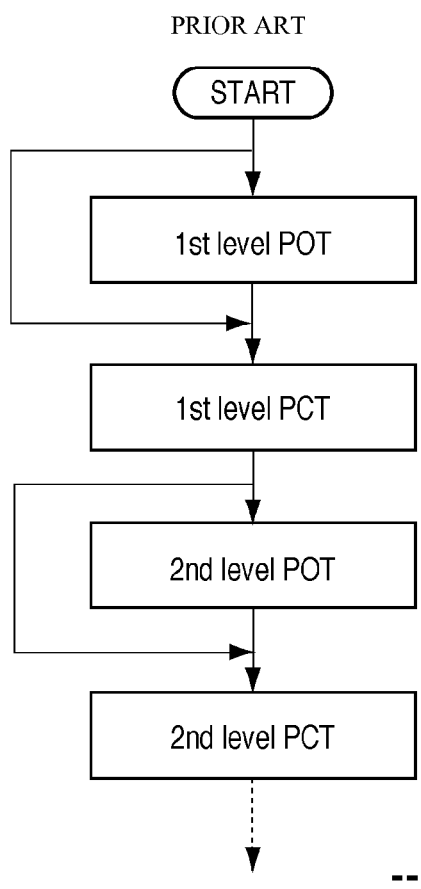
FIGS. 22A and 22B are flowcharts for encoding processing and decoding processing.

The technique (JPEG XR) based on reference 1 described above and the like has a block distortion suppression function used in encoding. The suppression processing is optional. That is, the user can designate one of the following three options: (1) perform no processing; (2) perform processing once before first stream conversion; and (3) perform processing once before first stream conversion, and once before second stream conversion. Option (1) allows high-speed encoding and decoding without any distortion suppressing effect. Option (3) provides a strong distortion suppressing effect, even though the encoding and decoding speeds are low. Option (2) comes between option (1) and option (3) in terms of effects. FIG. 22A shows a summary of the above description. Referring to FIG. 22A, "PCT" indicates stream conversion (frequency conversion) processing, and "POT" indicates distortion suppression processing.

Figure 22B:
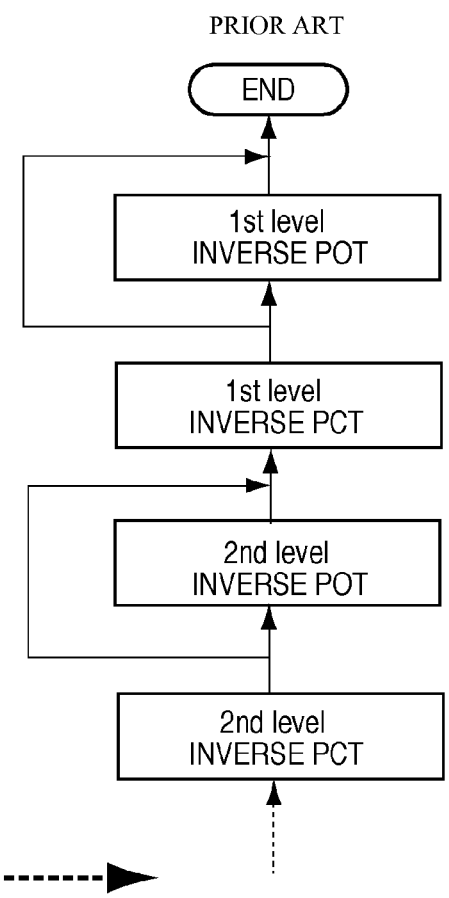

Decoding processing is inverse to encoding processing. In general, therefore, if option (1) is performed at the time of encoding, no distortion suppression processing is performed at the time of decoding. If option (3) is performed, distortion suppression processing is performed twice at the time of decoding. FIG. 22B shows this decoding processing.

The gist of the present invention resides in increasing the speed of decoding processing. When, therefore, encoded image data to be decoded has undergone distortion suppression processing at the time of encoding, the distortion suppression processing is intentionally skipped. Note that when image data having undergone distortion suppression processing once at the time of encoding is decoded into a full-resolution image upon skipping of the distortion suppression processing in decoding processing, the image quality does not degrade much. If, however, encoded data having undergone distortion suppression processing twice is decoded upon skipping of the distortion suppression processing twice, the image quality greatly degrades. An embodiment of the present invention is therefore configured to skip distortion suppression processing in decoding processing if the distortion suppression processing is performed once in encoding processing.

In this embodiment, a digital camera captures an image, and copies the image onto a storage device with a viewing function like an HDD recorder. Assume in the following description that an image is copied onto the storage device and is then displayed on a display. The digital camera will be described first, and then the reproduction processing (decoding processing) of the storage device will be described.

[Explanation of Digital Camera]

Figure 18:
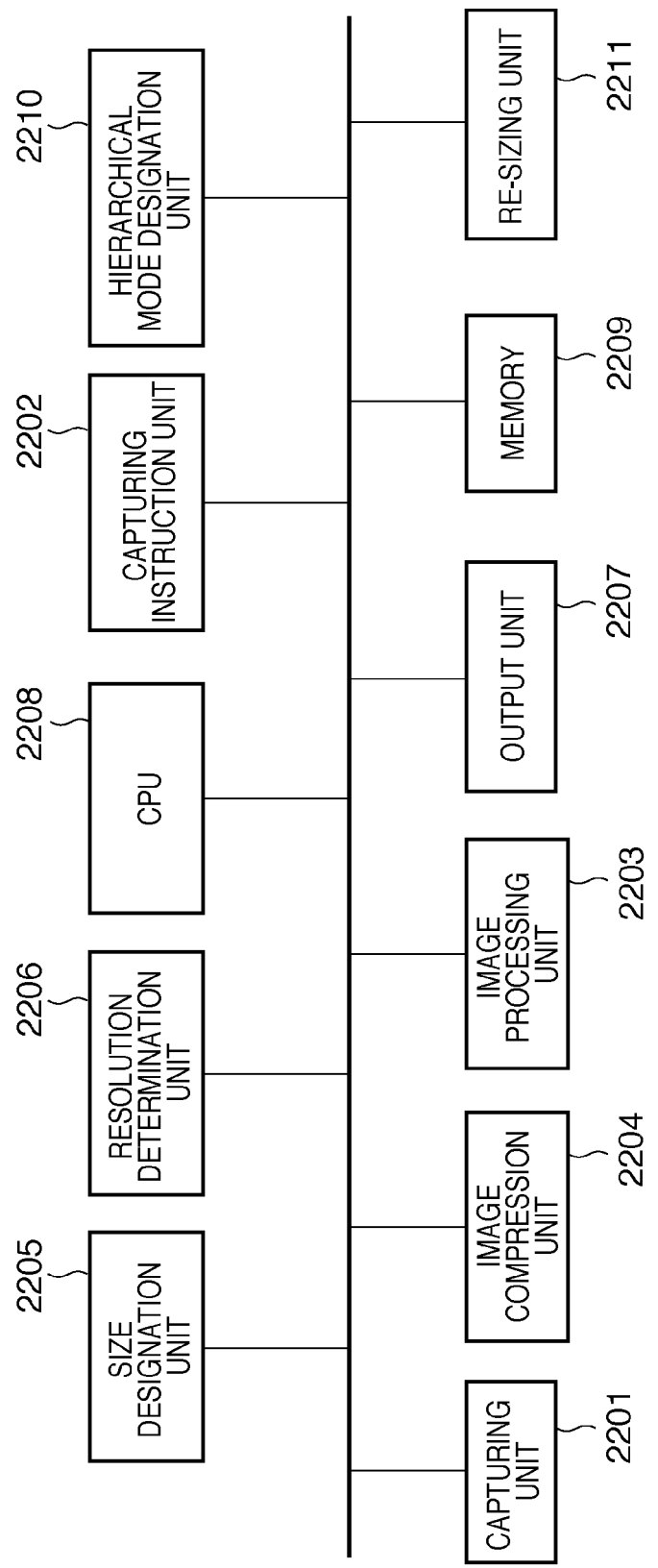
FIG. 18 is a block diagram of a digital camera.

The digital camera has the arrangement shown in FIG. 18. That is, the digital camera includes a capturing unit 2201, a capturing instruction unit 2202, an image processing unit 2203, an image compression unit 2204, a size designation unit 2205, a resolution determination unit 2206, an output unit 2207, a hierarchical mode designation unit 2210, and a re-sizing unit 2211. The digital camera includes a CPU 2208 functioning as a control unit for the overall apparatus and a memory 2209 which stores programs to be executed by the CPU 2208 and is used as a work area. The memory 2209 also stores various types of setting information. Assume that the user designates the size designation unit 2205 and the hierarchical mode designation unit 2210 by operating buttons provided on an operation panel (not shown) or by menu selection. The capturing instruction unit 2202 can be simply expressed as a shutter button.

On the digital camera of the embodiment, the user can designate, via the size designation unit 2205, the resolution (size) of an image to be captured before capturing. Three sizes L, M, and S are selectable. The size L is 4000 horizontal pixels×3000 vertical pixels (to be referred to as 4000×3000 pixels hereinafter). The size M is 2000×1500 pixels. The size S is 1600×1200 pixels. That is, the capturing unit 2201 of the digital camera of the embodiment includes an image sensing element having a resolution of 4000×3000 pixels. Information representing the selected size is stored in a preset area of the memory 2209.

As described above, when the user operates the shutter button included in the capturing instruction unit 2202 after setting a resolution via the size designation unit 2205, the digital camera captures an image with the designated resolution. The digital camera then performs image processing (e.g., white balance processing) and performs encoding processing (to be described later). The camera then stores the generated encoded data in the nonvolatile memory card connected to the output unit 2207.

Figure 19:
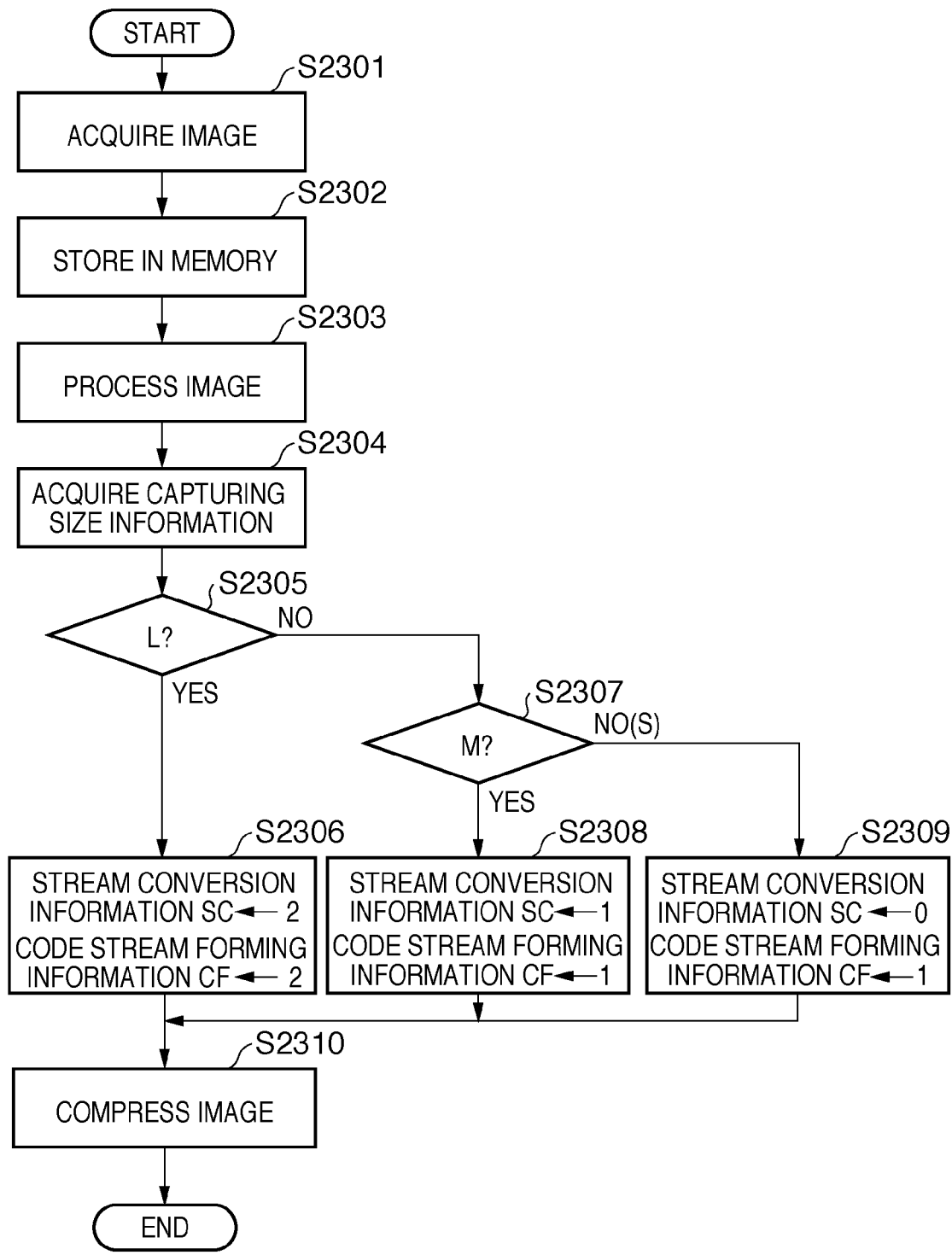
FIG. 19 is a flowchart for processing in the digital camera.

FIG. 19 is a flowchart illustrating the processing procedure to be performed by the CPU 2208 when the user operates the shutter button. Note that processing such as AF and AE is not directly relevant to the present invention, and hence a description of the processing will be omitted. A processing procedure will be described below with reference to the flowchart of FIG. 19.

First, the CPU 2208 converts a photoelectrically converted signal obtained by the capturing unit 2201 into digital data, acquires the converted data as image data (step S2301), and temporarily stores it in the memory 2209 (step S2302).

The CPU 2208 controls the image processing unit 2203 and causes it to execute image processing of the image data stored in the memory 2209 (step S2303). The image processing includes processing of converting RGB data in a Bayer matrix into a normal arrangement, white balance processing, sharpness processing, and color processing. The image data as the image processing result is stored in the memory 2209 again. After the image processing, the process advances to step S2304. The CPU 2208 acquires set size information from the memory 2209 (step S2304), and determines the size designated by the user (step S2305).

If the size L is designated (YES in step S2305), the CPU 2208 sets "2" in each of two pieces of information about image compression, i.e., stream conversion information SC and code stream forming information CF, and sets them in the image compression unit 2204 (step S2306). That is, the stream conversion information SC and code stream forming information CF can be regarded as parameters for image compression of the image compression unit 2204.

The stream conversion information SC and the code stream forming information CF will be described later in detail. In this embodiment, the stream conversion information SC takes three values "0", "1", and "2". "2" instructs the processing of improving image quality at an intermediate resolution. The stream conversion information SC is also used as information representing the execution count of distortion suppression processing to be described later. The code stream forming information CF takes two values "1" and "2". "2" instructs code stream formation of intermediate resolution priority. When both the stream conversion information SC and the code stream forming information CF are "2", the sequence involves complex processing, and the time required for processing increases. However, an L-size image has an enormous number of pixels and is therefore rarely displayed at the maximum resolution in actual display step. It will probably be displayed at an intermediate resolution lower by some grades than the maximum resolution. In this embodiment, if the size L is set, both the stream conversion information SC and the code stream forming information CF are set to "2", as described above, to perform processing corresponding to processing after display processing.

If the designated size is not L (if the size M or S is designated), the process advances to step S2307. The CPU 2208 determines whether the designated size is M. If the size M is designated, the CPU 2208 sets the stream conversion information SC "1" and the code stream forming information CF "1" in the image compression unit 2204 in step S2308.

Upon determining that the designated size is not M, i.e., the size S is set, the CPU 2208 sets the stream conversion information SC "0" and the code stream forming information CF "1" in the image compression unit 2204 in step S2309.

The process advances to step S2310 to cause the image compression unit 2204 to start compression processing. The CPU 2208 then stores the generated encoded data as a file in a memory card.

The image compression unit 2204 in this embodiment will be described in detail next. The image compression unit 2204 in this embodiment generates hierarchical encoded data having a hierarchical structure by using the technique disclosed in reference 1 described above. The characteristic features of this embodiment will be described below based on this technique.

As shown in FIG. 1A, the arrangement of the image compression unit 2204 in this embodiment includes a color conversion unit 101, a stream conversion unit 102, a quantizing unit 103, a coefficient prediction unit 104, a coefficient scanning unit 105, an entropy encoding unit 106, and a code stream generating unit 107. Prior to a description of the processing of an image compression unit 2104 in this embodiment, terms will be defined. "Block" is the minimum unit of encoding processing and has a size of 4×4 pixels in the embodiment. "Macro block" is a unit containing a plurality of blocks, which are 4×4 blocks (i.e., 16×16 pixels) in the embodiment. "Tile" is a unit containing a plurality of macro blocks, which are M×N (M and N are integers of 1 or more, and one of them is 2 or more) macro blocks. In the embodiment, M=6, and N=4. That is, one tile has a size corresponding to 6×4 macro blocks=96×64 pixels. The definitions of a block, macro block, and tile here are merely examples, and their sizes do not limit the present invention. The image compression unit 2104 compression-codes each tile. The minimum unit of the processing is a block (4×4 pixels).

The color conversion unit 101 converts RGB data (in the embodiment, each component has 8 bits=256 tones) into a YUV color space, and outputs the conversion result to the stream conversion unit 102. For example, RGB→YUV conversion is performed according to the following conversion formula:

$$V = B - R$$

$$t = R - G + \mathrm{Ceiling}(V/2)$$

$$U = -t$$

$$Y = G + \mathrm{Floor}(t/2)$$

where Ceiling(x) is a function that returns the minimum integer equal to or more than a real number x, and Floor(x) is a function that returns the maximum integer equal to or less than the real number x.

The Y, U, and V components are individually encoded. For the sake of simplicity, Y (luminance) will be explained below. Note that image data in the following description indicates image data expressed by the Y component (the U and V components can be understood by properly substituting them for the Y component).

Figure 2:
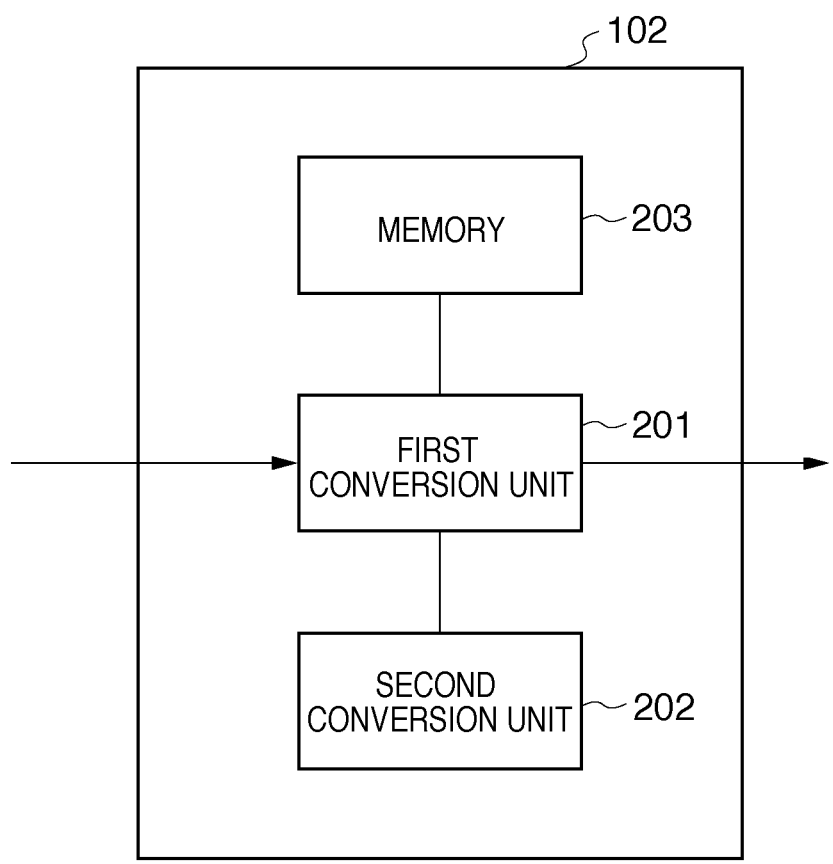
FIG. 2 is a block diagram of a stream conversion unit.

The stream conversion unit 102 includes a first conversion unit 201, a second conversion unit 202, and a memory 203, as shown in FIG. 2. The first conversion unit 201 performs essential processing and also controls the stream conversion unit 102. The second conversion unit 202 performs optional processing which need not always be executed. The first conversion unit 201 is in charge of handling to determine whether to cause the second conversion unit 202 to execute processing. If the second conversion unit 202 executes processing, the load on encoding processing and the time required for the processing increase. However, a decoded image (especially, an image having a resolution lower than the original resolution) has a more desirable image quality. The memory 203 holds the above-described stream conversion information SC.

Figure 3:
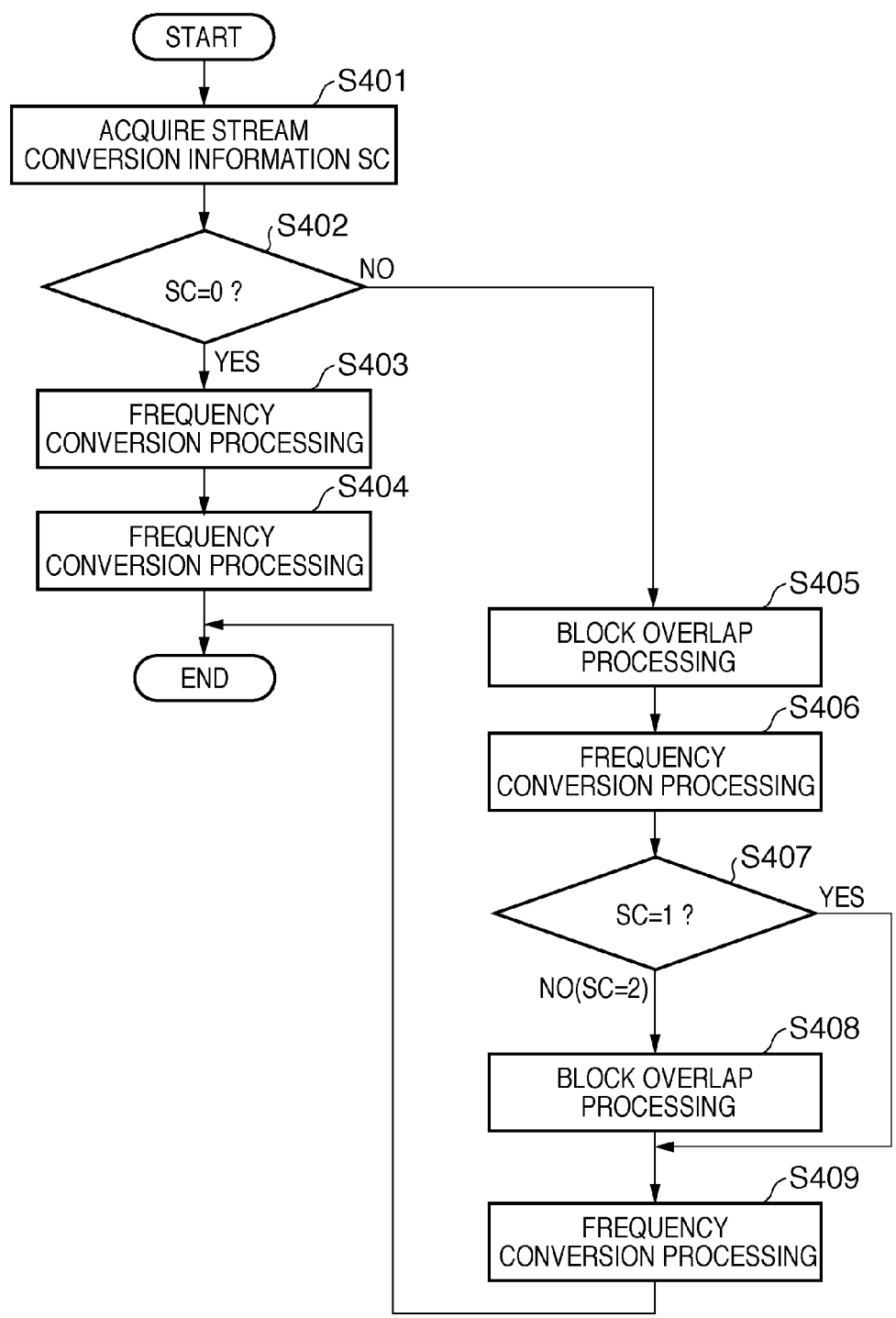
FIG. 3 is a flowchart illustrating the processing procedure of the stream conversion unit.
Figure 4:
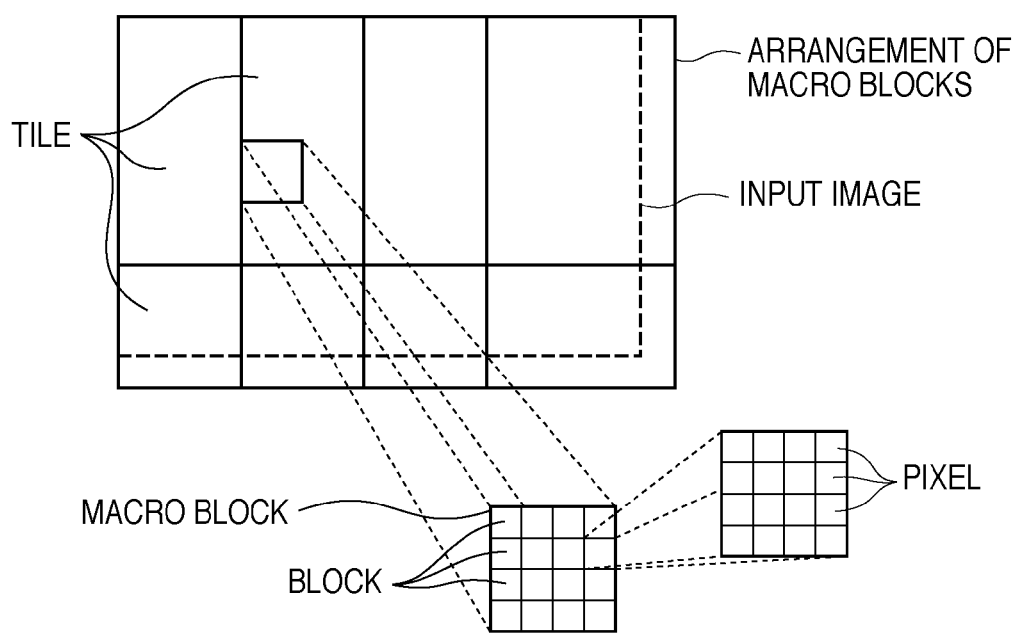
FIG. 4 is a view showing the relationship between the tiles, macro blocks, and blocks in an image.

The stream conversion unit 102 receives Y component data, and segments the image into tiles, as shown in FIG. 4 (in the embodiment, one tile includes 6×4 macro blocks). The memory 203 stores the stream conversion information SC ("0", "1", or "2"). The first conversion unit 201 and the second conversion unit 202 execute processing in accordance with the flowchart of FIG. 3.

In step S401, the first conversion unit 201 acquires the stream conversion information SC from the memory 203. In step S402, the first conversion unit 201 determines whether the stream conversion information SC is "0". If the stream conversion information SC is "0", the first conversion unit 201 does not request conversion processing of the second conversion unit 202. The first conversion unit 201 executes frequency conversion processing twice in steps S403 and S404. This processing will be described in detail with reference to FIG. 5.

First, each of 4×4 blocks included in one macro block undergoes frequency conversion processing (first stage). One DC component (direct current component) data and 15 (=4×4−1) AC component (alternating current component) data are obtained from one block. As described above, one macro block includes 4×4 blocks. Hence, 4×4 DC component data and 15×4×4 AC component data are obtained from one macro block. A set of 4×4 component values will be called a DC block. This is the process in step S403, i.e., the first frequency conversion processing.

The process in step S404 (second frequency conversion processing) will be described next. The target of the second frequency conversion in step S404 is the above-described DC block (second stage). As a result, one DC component value and 15 AC component values are obtained from the DC block. The latter AC component values are calculated from the DC components of the DC block (4×4 pixels) and are therefore represented as ACDC components in FIG. 5.

To discriminate the components generated in steps S403 and S404, the DC component data and the AC component data obtained in the first process (step S403) may be called DC component data of first level and AC component data of first level, respectively. The DC component data and the ACDC component data obtained in the second process (step S404) may be called DC component data of second level and AC component data of second level, respectively.

Figure 6:
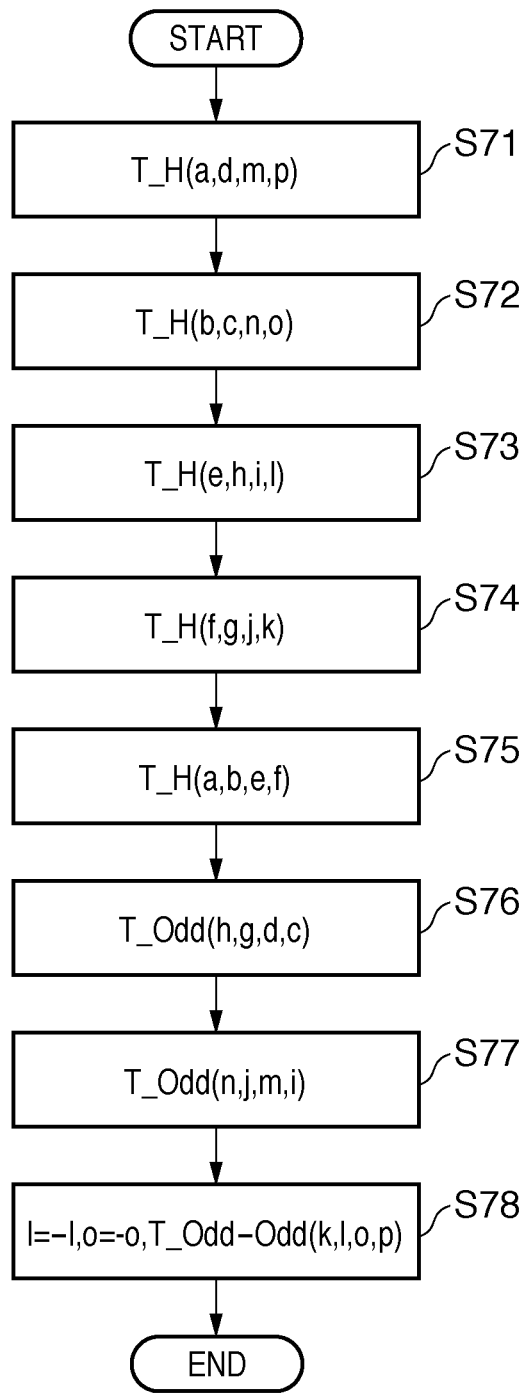
FIG. 6 is a flowchart illustrating the processing procedure of frequency conversion processing.

The frequency conversion processing is performed in accordance with the procedure of the flowchart of FIG. 6. Note that the flowchart illustrates processing of one block (4×4 pixels). That is, since a macro block includes 4×4 blocks, processing conforming to the flowchart of FIG. 6 is performed 16 times in the first frequency conversion processing (step S403). Conversion processing (filtering processing) in each of steps S71 to S78 of the flowchart of FIG. 6 is performed by one of conversion circuits (filtering circuits) shown in FIGS. 7B to 7D, which has the same name as the processing. Arguments "a" to "p" of each conversion processing in FIG. 6 correspond to pixel positions "a" to "p" in a block of interest shown in FIG. 7A.

First conversion processing T_H(a, d, m, p) in step S71 of FIG. 6 is executed by the circuit arrangement shown in FIG. 7B. More specifically, a, d, m, and p in FIG. 7A are set in input terminals X1, X2, X3, and X4 in FIG. 7B, respectively, and calculation starts. The initial values of a, d, m, and p are updated to four values that appear at output terminals Y1, Y2, Y3, and Y4. This also applies to processing in steps S72 to S78. In step S78, after the signs of the data l and o are reversed, T_Odd_Odd calculation processing (FIG. 7D) is executed.

Simply put, in the first four processes (steps S71 to S74) for the DC components of the processing in FIG. 6, temporary low frequency components obtained from the data of the block of interest (4×4 pixels) are concentrated to the 2×2 positions (a, b, e, and f in FIG. 7A) of the upper left corner. In step S75, one DC component of the block of interest is stored at the position "a" in FIG. 7A using the data of the 2×2 temporary low frequency components stored at the positions {a, b, e, f} of the upper left corner. The 15 AC components are generated by the processes in steps S71 to S78.

The first frequency conversion processing is performed for each of the 16 blocks included in the macro block of interest in FIG. 6. In the second frequency conversion processing, processing represented by the flowchart of FIG. 6 is performed once, regarding that the DC block (4×4 DC component values) obtained from the macro block of interest has the arrangement shown in FIG. 7A.

As described above, the two frequency conversion processes yield one DC component, 15 (=4×4−1) ACDC components, and 240 (=15×4×4) AC components from one macro block. As easily understood by those skilled in the art, the size of the image obtained by decoding only the encoded data of the DC component of this macro block is 1/16 the size of the original image in both the horizontal and vertical directions. The size of the image obtained by decoding only the encoded data of the DC and ACDC components is ¼ the size of the original image in both the horizontal and vertical directions. The image obtained by decoding all the DC, ACDC, and AC components has the same size as that of the original image.

Encoding processing of the embodiment generates encoded data of each tile. In the embodiment, one tile includes 6×4 macro blocks. Hence, the processes in steps S403 and S404 are repeated as many times as the macro blocks included in one tile.

Referring back to FIG. 3, if the first conversion unit 201 determines in step S402 that the stream conversion information SC acquired from the memory 203 is not "0", i.e., SC=1 or 2, the process advances to step S405. In step S405, the first conversion unit 201 instructs the second conversion unit 202 to start conversion processing.

The second conversion unit 202 performs correction processing across (overlapping) a block boundary to correct its distortion that occurs because the processing of the first conversion unit 201 is based on calculation in each block. The processing of the second conversion unit 202 will be referred to as block overlap processing hereinafter.

Figures 8, 9:
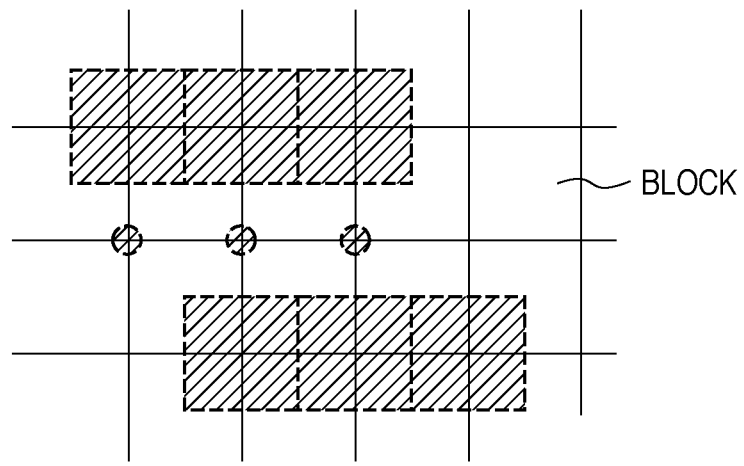
FIG. 8 is a view showing a target of block overlap processing.
FIG. 9 is a view for explaining a method of predicting a DC component X of interest.
Figure 16:
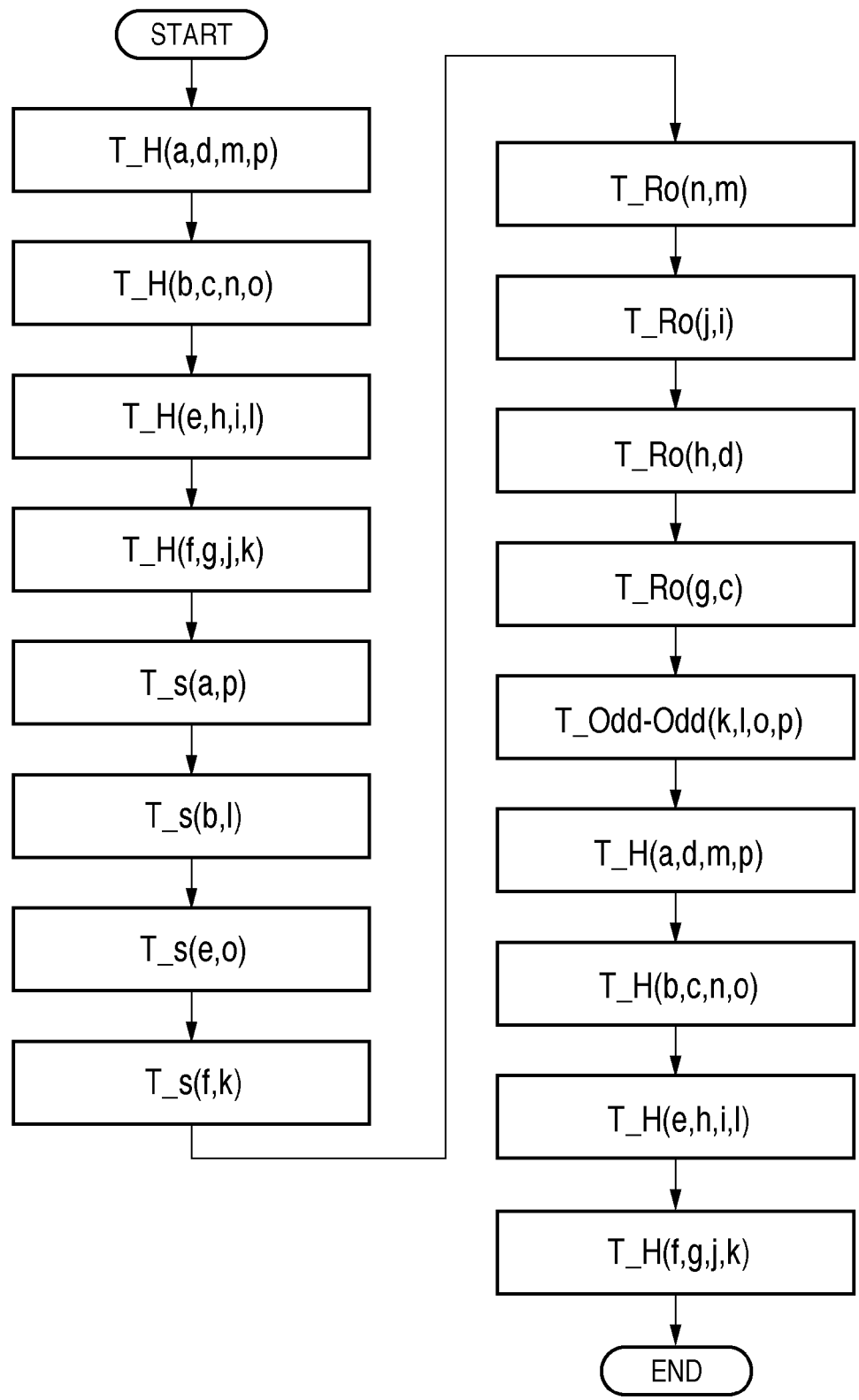
FIG. 16 is a flowchart for block overlap processing.
Figure 17A:
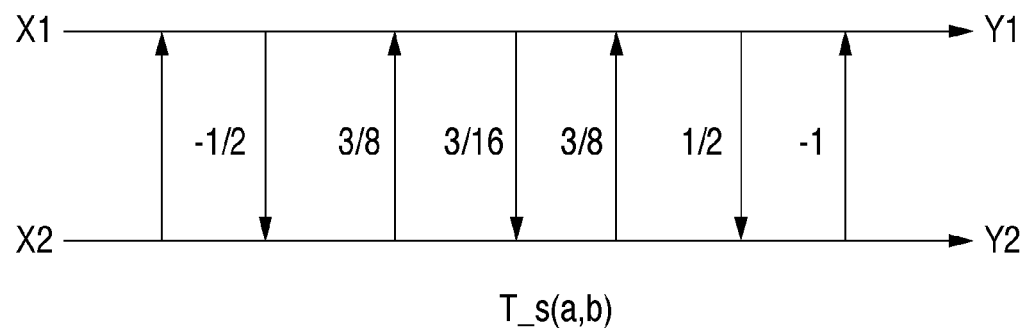
FIGS. 17A and 17B are views each showing a circuit arrangement associated with block overlap processing.
Figure 17B:
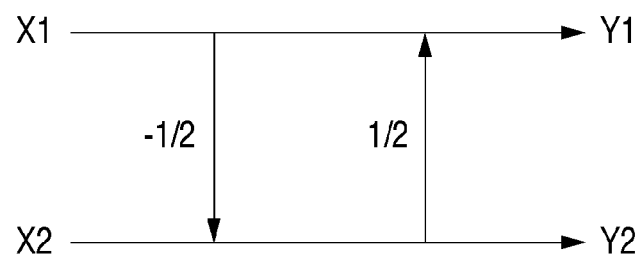

Upon receiving an activation instruction from the first conversion unit 201, the second conversion unit 202 performs block overlap processing using a window across (overlapping) the boundary between blocks (4×4 pixels) in an input tile, as shown in FIG. 8 (step S405). The block overlap processing is illustrated by the flowchart of FIG. 16. In FIG. 16, two filtering processes, i.e., T_s( ) and T_Ro( ) are added to the above-described processing shown in the flowchart of FIG. 6. The circuit arrangements shown in FIGS. 17A and 17B implement T_s( ) and T_Ro( ). T_s( ) and T_R processing are 2-input 2-output filtering processes. The block overlap processing processes a range across the process target blocks of the above-described frequency conversion processing, thereby suppressing discontinuity at the block boundary of frequency conversion.

Then, the process advances to step S406. The first conversion unit 201 performs frequency conversion processing once. The frequency conversion processing in step S406 is executed for each of 4×4 blocks in a region corresponding to the macro block in FIG. 5. That is, 16 blocks are frequency-converted to calculate 16 DC components and 240 AC components, as in step S403. In the embodiment, one tile includes 6×4 macro blocks. Hence, the processing is executed 24 times.

Next, in step S407, the first conversion unit 201 determines whether the stream conversion information SC acquired from the memory 203 is "1". If it is determined that the stream conversion information SC is "1", the process advances to step S409. If it is determined that the stream conversion information SC is not "1", i.e., "2", the process advances to step S408 to cause the second conversion unit 202 to execute second block overlap processing (FIG. 16). Note that 6×4 DC blocks are targeted for the block overlap processing executed by the second conversion unit 202 in step S408. In step S409, second frequency conversion processing is executed. The second frequency conversion processing is the same as in step S404 except that it targets the set of a plurality of DC blocks included in one tile that has undergone the process in step S406 or S408. More specifically, one tile includes 6×4 macro blocks, and one DC block is generated from one macro block. Hence, the frequency conversion is executed for 24 DC blocks.

The above-described processing will be summarized. The sequence of processing for a macro block according to the embodiment is as follows.

When the size of an image to be captured is S:
Frequency conversion processing→frequency conversion processing When the size of an image to be captured is M:
Block overlap processing→frequency conversion processing→frequency conversion processing When the size of an image to be captured is L:
Block overlap processing→frequency conversion processing→block overlap processing→frequency conversion processing The processing of the stream conversion unit 102 in FIG. 1A has been described above. The stream conversion unit 102 outputs the conversion result to the quantizing unit 103 of the succeeding stage. The quantizing unit 103 sets a Q parameter (to be referred to as a QP hereinafter), and calculates a quantization step based on the set QP and the following conversion formula:

When QPindex≦1, QP=QPindex.

When QPindex>16, QP=((QPindex % 16)+16)<<((QPindex>>4)−1) (where x % y is a function that returns the quotient of the division x/y, x<<y is a function that shifts a value x by y bits to the left (the more significant side), and x>>y is a function that shifts the value x by y bits to the right (the less significant side))

Note that according to this embodiment, there are following three degrees of freedom in setting a QP to be described here, and a QP can be set by combining them.

Axis of degree of freedom 1: spatial degree of freedom:
1.1 Set a single QP for all macro blocks in an image
1.2 Set a single QP for all macro blocks in a tile
1.3 Freely set a QP for each macro block in a tile
Axis of degree of freedom 2: frequency degree of freedom:
2.1 Set a single QP for all frequency components
2.2 Set a single QP for DC components and low-pass components (ACDC components), and different QPs for high-pass components (AC components)
2.3 Set a single QP for low-pass and high-pass components, and different QPs for DC components
2.4 Set a QP for each frequency component
Axis of degree of freedom 3: color plane degree of freedom:
3.1 Set a single QP for all color planes
3.2 Set a QP for a luminance plane, and a single QP for planes other than the luminance plane
3.3 Set a QP for each plane For example, quantization in conventional JFIF is done based on spatial degree of freedom 1.1 and color plane degree of freedom 3.2. Note that JFIF assigns a quantization step to each coefficient in a macro block and therefore has no item corresponding to the frequency degree of freedom.

The quantizing unit 103 thus ends the quantization processing and outputs the quantized data to the coefficient prediction unit 104. The coefficient prediction unit 104 performs coefficient prediction and outputs a prediction error. Coefficient prediction is executed based on different rules for the DC components, low-pass components (ACDC components), and high-pass components (AC components). A prediction calculation method is decided for each tile. A coefficient of an adjacent tile is not used. Prediction calculation of each component by the coefficient prediction unit 104 will be described below.

(1) DC Component Prediction

Figure 5:
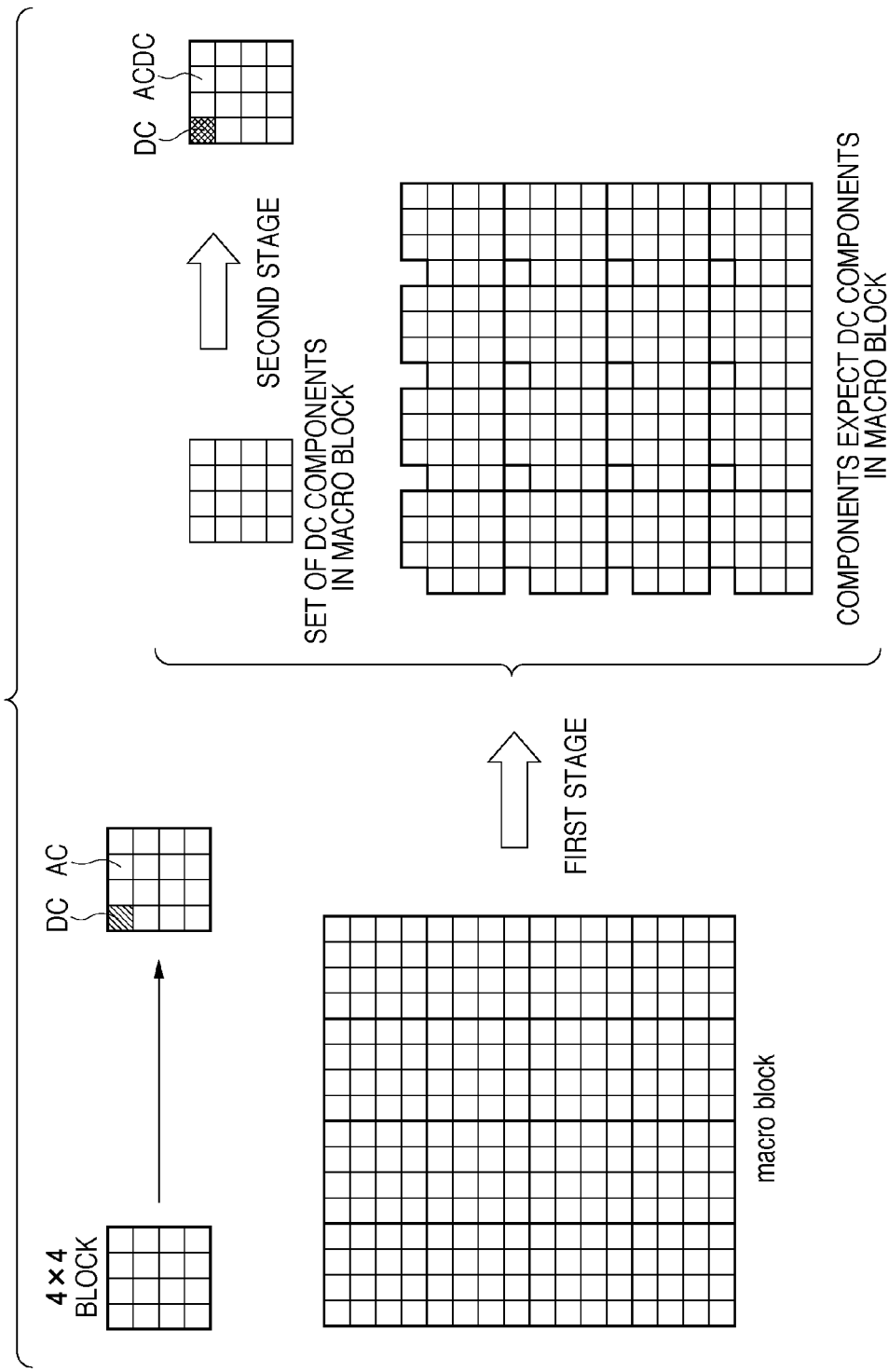
FIG. 5 is a view for explaining stream conversion processing.

As described above, in the embodiment, one tile includes 6×4 macro blocks. One DC component is obtained from one macro block (FIG. 5). Hence, 6×4 DC components that have undergone the quantization processing are obtained from one tile. DC component prediction processing (prediction error calculation processing) of the coefficient prediction unit 104 will be described.

DC component values in one tile are raster-scanned. FIG. 9 shows the relationship between a DC component X of a macro block of interest and neighboring DC components D, T, and L relatively adjacent to the DC component X during scanning processing of a tile. Note that in raster scanning, the neighboring DC components D, T, and L near the DC component X of interest are located at positions where prediction processing (prediction error calculation) has already ended. When the DC component X of interest is at the upper left corner, all the neighboring DC components D, T, and L are located outside the tile. When the DC component X of interest is on the first line except the upper left corner, the neighboring DC components D and T are located outside the tile. When the DC component X of interest is on the left edge except the upper left corner, the neighboring DC components D and L are located outside the tile. The neighboring DC components outside the tile to be referred to are assumed to have a predetermined value (e.g., "0"). The predetermined value need not always be "0" if it is the same as in the image decoding apparatus.

Figure 10:
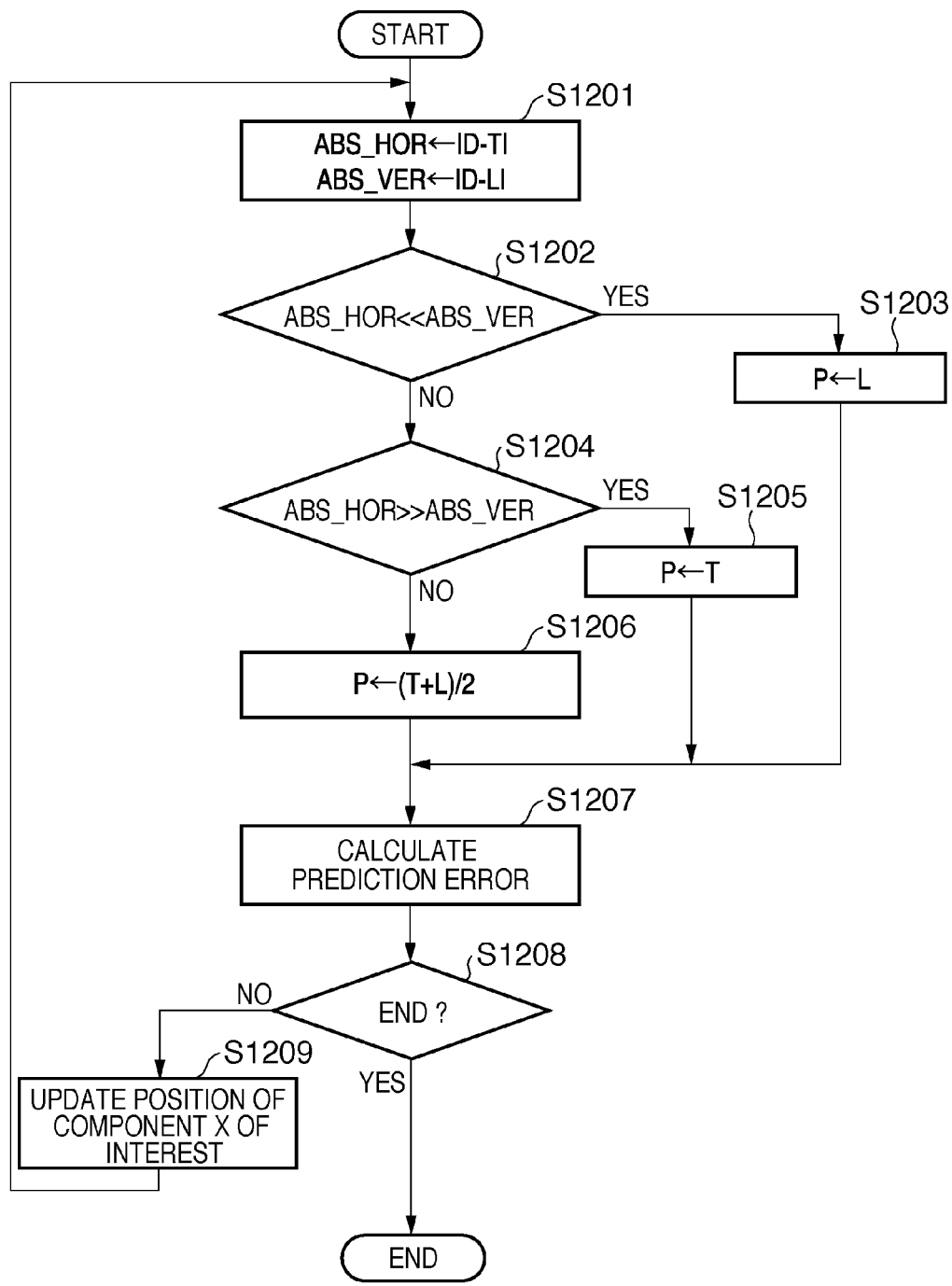
FIG. 10 is a flowchart illustrating the processing procedure of DC component prediction processing.

DC component prediction processing in a tile will be described below with reference to the flowchart of FIG. 10.

First, in step S1201, the coefficient prediction unit 104 calculates a difference absolute value (horizontal difference absolute value) ABS_HOR between the neighboring DC component values D and T, and a difference absolute value (vertical difference absolute value) ABS_VER between the neighboring DC component values D and L. In step S1202, the coefficient prediction unit 104 determines whether ABS_HOR<<ABS_VER, i.e., ABS_HOR is sufficiently smaller than ABS_VER. More specifically, the coefficient prediction unit 104 determines that ABS_HOR is sufficiently smaller than ABS_VER when $$ABS\_HOR - ABS\_VER < Th$$

where Th is a predetermined positive threshold.

Figure 11:
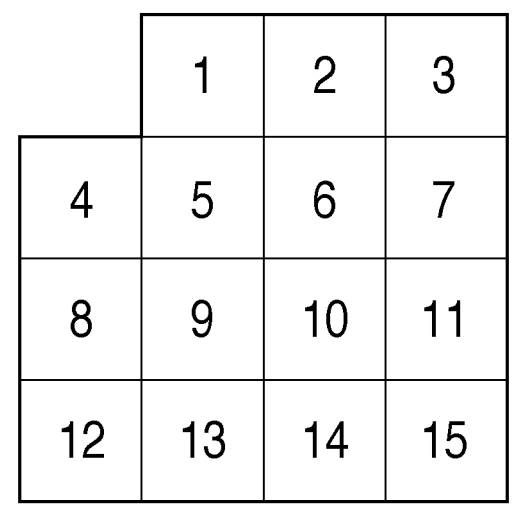

Simply put, in the process in step S1202, the coefficient prediction unit 104 determines whether similar images continue in the horizontal direction rather than in the vertical direction near the tile of interest (the position X in FIG. 11). If ABS_HOR<<ABS_VER in step S1202, the process advances to step S1203. The coefficient prediction unit 104 decides to use the left DC component L as a predicted value P of the DC component X of interest. If NO in step S1202, the process advances to step S1204. In step S1204, the coefficient prediction unit 104 determines whether ABS_HOR>>ABS_VER, i.e., ABS_VER is sufficiently smaller than ABS_HOR. As in step S1202, the coefficient prediction unit 104 determines that ABS_VER is sufficiently smaller than ABS_HOR when $$ABS\_VER - ABS\_HOR < Th$$

If ABS_VER<<ABS_HOR (YES in step S1204), the probability that the difference between the DC component X of interest and the DC component T located adjacent in the vertical direction is small is high. The process advances to step S1205. The coefficient prediction unit 104 decides to use the upper DC component T as the predicted value P of the DC component X of interest. If NO in step S1204, the process advances to step S1206. The coefficient prediction unit 104 decides to use (T+L)/2 as the predicted value P of the DC component X of interest. Note that (T+L)/2 is obtained by calculating T+L and then shifting the value to the lower side by one bit (fractions below the decimal point are dropped).

In one of steps S1203, S1205, and S1206, the predicted value P of the DC component X of interest is obtained. In step S1207, the coefficient prediction unit 104 calculates, as a prediction error, the difference between the DC component X of interest and the predicted value P. Then, the process advances to step S1208. The coefficient prediction unit 104 determines whether prediction error calculation has ended for all DC components in the tile of interest. If NO in step S1208, the position of the DC component X of interest is updated to the next position in step S1209, and the process returns to step S1201. In the above-described way, prediction error calculation processing of the 6×4 DC components in the tile of interest is performed.

(2) Low-Pass Component (ACDC Component) Prediction

FIG. 11 shows the arrangement of ACDC components after quantization of one macro block. This arrangement also indicates ACDC component values (FIG. 5) obtained by performing second frequency conversion processing for a macro block. Targets of low-pass component prediction processing are ACDC components {1, 2, 3} or ACDC components {4, 8, 12} in FIG. 11. For example, when it is decided to perform prediction processing of the ACDC components {4, 8, 12} in FIG. 11, the ACDC components {1, 2, 3, 5, 6, 7, 9, 10, 11, 13, 14, 15} at the remaining positions do not undergo prediction error calculation processing. If the macro block of interest is located on the left edge or upper edge of the tile, there is no macro block which is adjacent to the macro block of interest and should be referred to. If no macro block to be referred to exists, it is assumed that {1, 2, 3} have undergone prediction error calculation in the inexistent macro block. The prediction error calculation targets may be {4, 8, 12}. That is, the targets need only be the same on the encoding side and on the decoding side.

Figure 12:
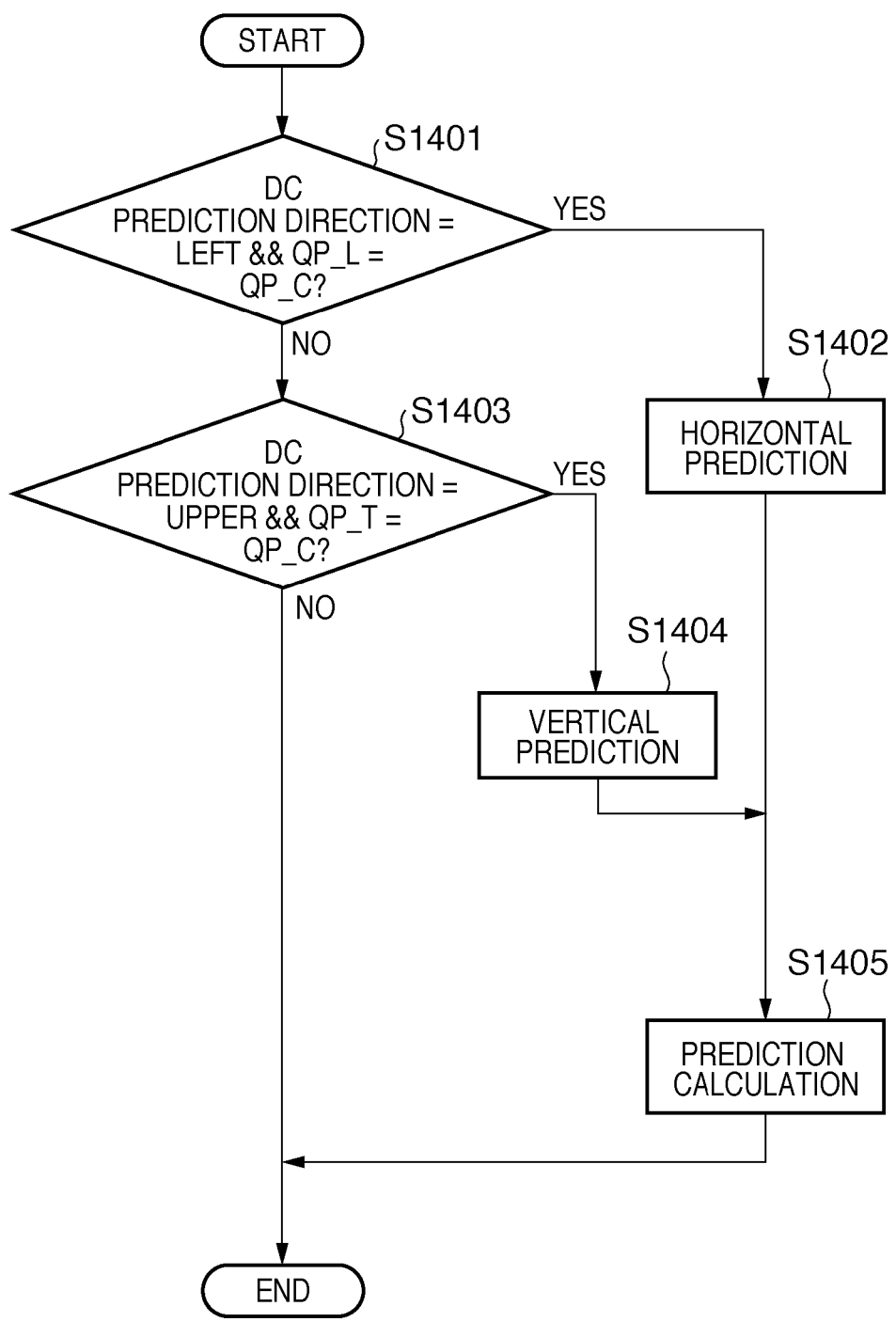
FIG. 12 is a flowchart illustrating the processing procedure of low-pass component prediction processing.

FIG. 12 is a flowchart illustrating the processing procedure of low-pass component prediction processing. The processing will be described below with reference to the flowchart. In step S1401, the coefficient prediction unit 104 determines whether the DC prediction direction of the macro block on the left side of the block of interest is horizontal, and a quantization parameter QP_C of the DC component of the macro block of interest equals a quantization parameter QP_L of the DC component of the macro block on the left side of the macro block of interest. If the two conditions are satisfied (YES in step S1401), the coefficient prediction unit 104 decides the horizontal direction as the prediction direction of the block of interest. More specifically, {1, 2, 3} in FIG. 11 are decided as prediction error calculation targets, and the remaining components are excluded from the targets (step S1402). The coefficient prediction unit 104 executes prediction error calculation in step S1405. If NO in step S1401, the coefficient prediction unit 104 advances the process to step S1403. In step S1403, the coefficient prediction unit 104 determines whether the DC prediction direction of the macro block on the upper side of the block of interest is vertical, and the quantization parameter QP_C of the DC component of the macro block of interest equals a quantization parameter QP_T of the DC component of the macro block on the upper side of the macro block of interest. If the two conditions are satisfied, the coefficient prediction unit 104 decides the vertical direction as the prediction direction of the block of interest. More specifically, {4, 8, 12} in FIG. 11 are decided as prediction error calculation targets (step S1404), and the remaining components are excluded from the targets. The coefficient prediction unit 104 executes prediction error calculation in step S1405. If NO in step S1403, the processing ends without performing prediction error calculation for the ACDC components in the macro block of interest.

(3) High-Pass Component (AC Component) Prediction

FIGS. 13A to 13C are views showing (three) prediction directions of high-pass components. High-pass components here are the AC components excluding the DC components of 4×4 blocks obtained by the first frequency conversion in FIG. 5 (FIG. 5). One DC component and 15 AC components are obtained from one block that has undergone frequency conversion. In FIG. 13D, numbers 1 to 15 are assigned to indicate the positions of the AC components in the arrangement. Targets of high-pass component prediction are AC components {1, 2, 3} or AC components {4, 8, 12} in FIG. 13A. For example, when it is decided to obtain prediction errors of the AC components {1, 2, 3}, the AC components {4, 5, 6, ..., 15} are excluded from the prediction error calculation processing targets.

Figure 14:
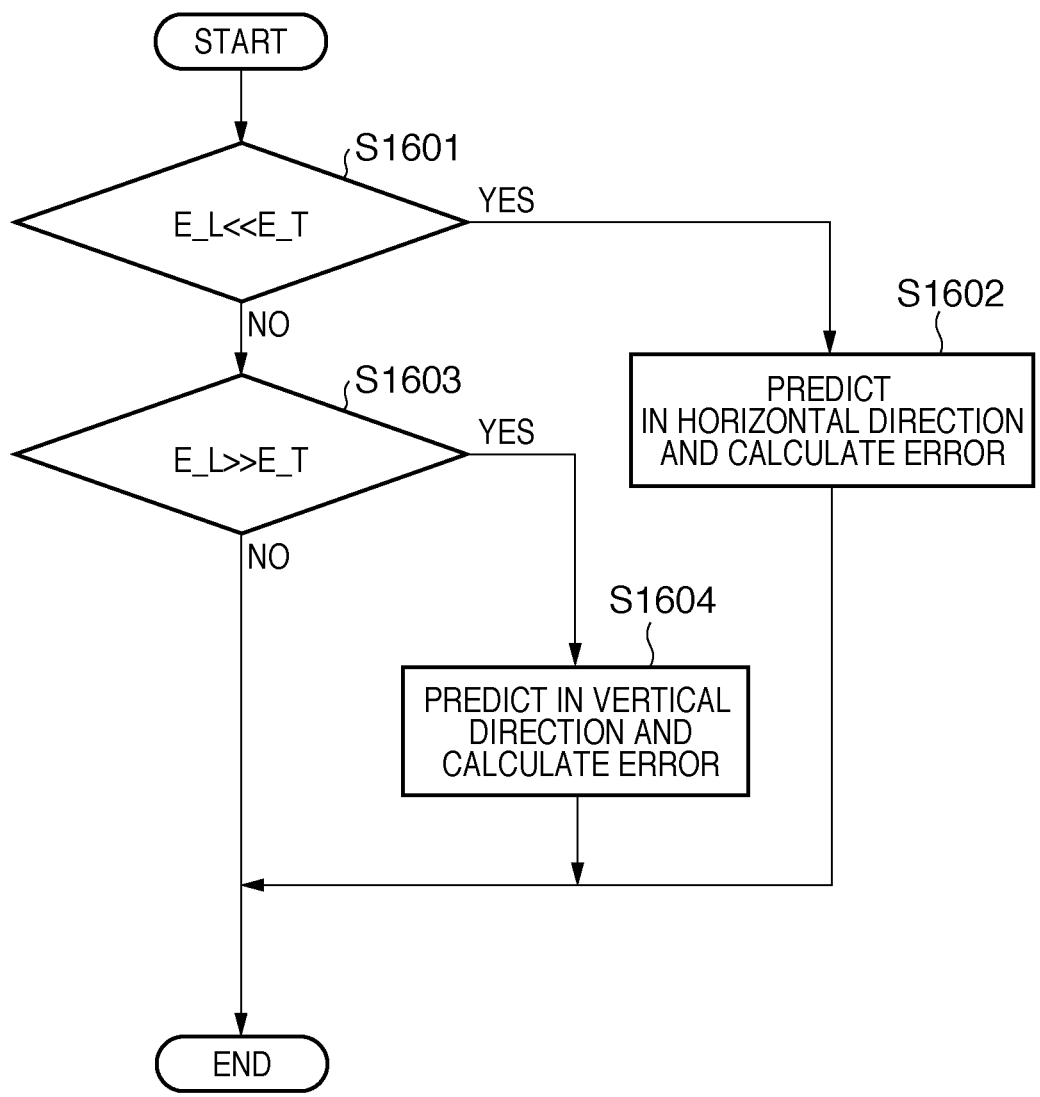
FIG. 14 is a flowchart illustrating the processing procedure of high-pass component prediction processing.

FIG. 14 is a flowchart illustrating high-pass component prediction processing. The processing will be described below with reference to FIG. 14.

An energy value E_L of the AC component values at the positions {4, 8, 12} of blocks on the left edge of the tile of interest and an energy value E_T of the AC component values at the positions {1, 2, 3} of blocks on the upper edge of the tile of interest are obtained. The tile of interest includes 4×4 blocks. The value E_L is the sum of the absolute values of the AC components at the positions {4, 8, 12} of the 16 blocks. The value E_T is the sum of the absolute values of the AC components at the positions {1, 2, 3} of the 16 blocks. In step S1601, the coefficient prediction unit 104 determines whether E_L is sufficiently smaller than E_T. The coefficient prediction unit 104 may determine whether $$E\_L - E\_T < Th$$

is satisfied, where Th is a preset positive threshold.

Upon determining that E_L<<E_T, the coefficient prediction unit 104 decides the horizontal direction as the direction of obtaining the prediction errors of the AC components of the block of interest. In step S1602, the coefficient prediction unit 104 scans the AC components at the positions {4, 8, 12} of the blocks in the horizontal direction shown in FIG. 13A, thereby obtaining prediction errors.

If NO in step S1601, the process advances to step S1603 to determine whether E_T is sufficiently smaller than E_L. Using the above threshold Th, the coefficient prediction unit 104 may determine whether $$E\_T - E\_L < Th$$

is satisfied.

Upon determining in step S1603 that E_T<<E_L, the coefficient prediction unit 104 decides the vertical direction as the direction of obtaining the prediction errors of the AC components of the block of interest. In step S1604, the coefficient prediction unit 104 scans the AC components at the positions {1, 2, 3} of the blocks in the horizontal direction shown in FIG. 13B, thereby obtaining prediction errors.

If NO in step S1603, the coefficient prediction unit 104 does not perform prediction error calculation for the AC components in the macro block of interest (FIG. 13C). In the embodiment, one tile includes 6×4 macro blocks. Hence, the header of finally output encoded data of each tile stores information representing "horizontal", "vertical", or "no scan" as the scanning direction of each macro block.

The processing of the coefficient prediction unit 104 has been described above. As the result of prediction processing of the coefficient prediction unit 104, the prediction errors of the DC components, ACDC components, and AC components and a plurality of component values that have not undergone prediction error calculation are output to the coefficient scanning unit 105.

The coefficient scanning unit 105 includes a buffer to store the above-described information of one tile. The coefficient scanning unit 105 zigzag-scans the components (the prediction errors and the components that have not undergone prediction error calculation), like coefficient scanning of JPEG, and rearranges them in the buffer. Since this operation is not essential to the present invention, a detailed description of the operation will be omitted.

The entropy encoding unit 106 entropy-encodes the values arranged in the internal buffer of the coefficient scanning unit 105 (assigns Huffman code words). In the embodiment, as for DC components, the difference between adjacent blocks is calculated and Huffman-coded. As for low-pass components and high-pass components, two-dimensional Huffman coding is performed for each combination of a zero-run coefficient and a non-zero coefficient in accordance with the zigzag-scanning order. The two-dimensional Huffman coding is executed using the same technique as JPEG.

When entropy encoding of one tile has finished, the code stream generating unit 107 rearranges encoded data as the result of entropy encoding, and generates a code stream with a header added to the top.

Figure 15:
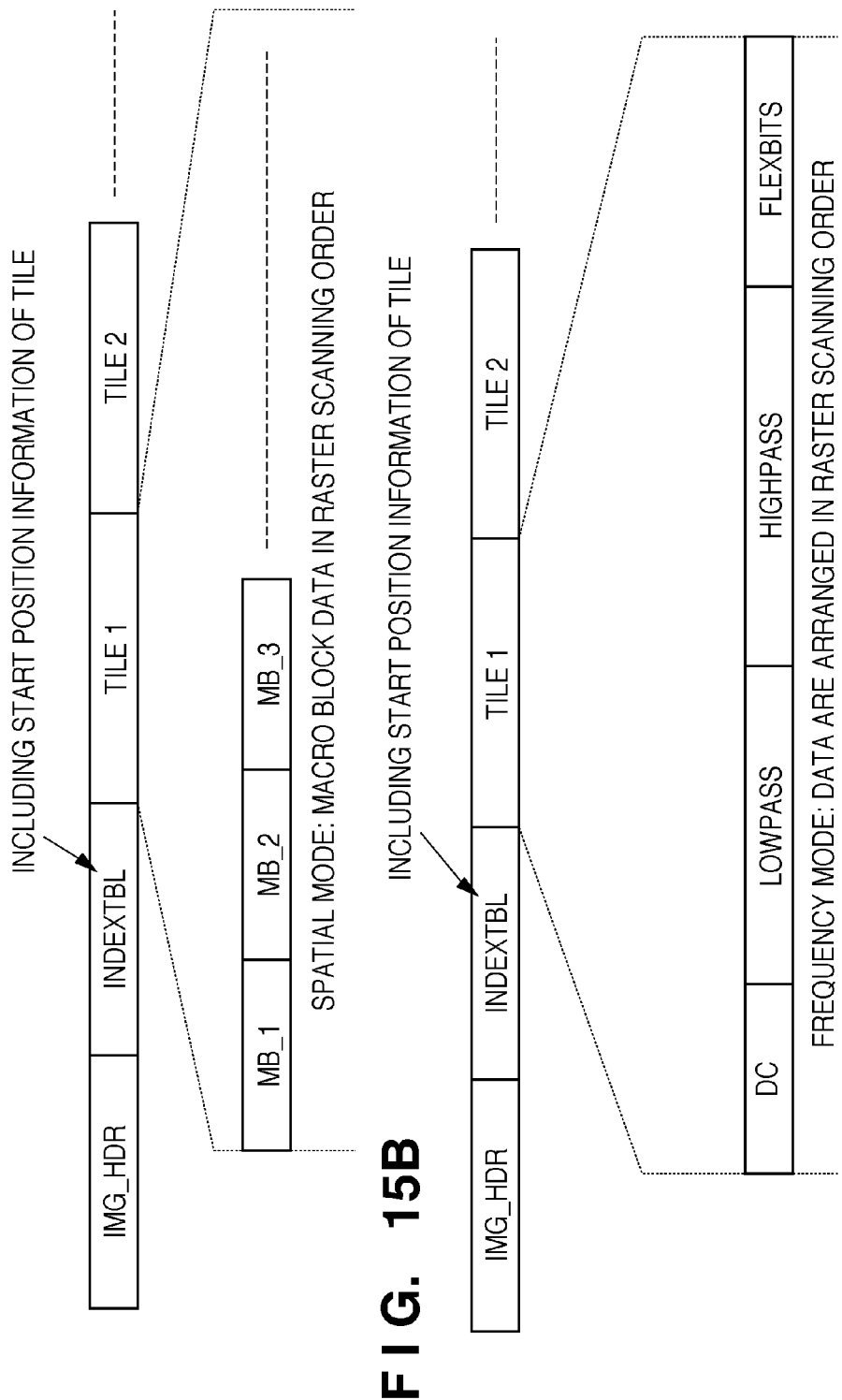
FIGS. 15A and 15B are views showing the data structure of encoded data.

In the embodiment, there are two arrangement modes of the code stream of one tile. One is a spatial mode (spatial order code stream), and the other is a frequency mode (resolution order code stream). In the spatial mode, data of macro blocks in a tile are arranged in the raster scanning order, as shown in FIG. 15A. One macro block data contains encoded data of DC components, those of ACDC components, and those of AC components in this order. In the frequency mode, encoded data of DC components in a tile are arranged first, those of ACDC components are arranged next, and those of AC components are arranged at last, as shown in FIG. 15B. That is, encoded data are arranged from a low frequency to a high frequency.

The format in the spatial mode is convenient for reproducing an original image from the beginning. On the other hand, the latter, i.e., the frequency mode, is convenient for reproducing an image having a resolution (intermediate resolution) lower than that of an original image. That is, the frequency mode is suitable for reproducing an image while gradually raising its resolution. "FLEXBITS" in encoded data of the frequency mode shown in FIG. 15B will briefly be explained. Each of component values (including prediction error values) is divided into an upper bit group and a lower bit group at a predetermined bit position of multiple bits representing the component value. It is highly probable that the upper bit group continuously includes the same value, and it therefore undergoes encoding. The values in the lower bit group have no continuity, so no encoding is performed. FLEXBITS includes unencoded data of the lower bits of each of component values (including prediction error values).

In this embodiment, if the above-described code stream forming information CF is "2", the code stream generating unit 107 generates a code stream by arranging encoded data in an order according to the frequency mode. If the code stream forming information CF is "1", the code stream generating unit 107 generates a code stream in the spatial mode. Simply put, when encoding an image having a high resolution (in the embodiment, the size is L or more), the image has an enormous number of pixels, and it is highly probable that the user generally views (decodes) an image having a lower resolution. Hence, a code stream is generated in the frequency mode. If the size is smaller than L, a code stream is formed in the spatial mode.

In the embodiment, the frequency mode or spatial mode is decided by determining whether the size is equal to or more than L or less. The determination may be done based on whether the size is equal to or more than M or less. Especially, recent digital cameras are steadily increasing the number of effective pixels, and the number of selectable image sizes is expected to increase from three to four or more. Hence, the user may set the size (number of pixels) as the threshold. In either case, setting information representing a minimum resolution for the spatial mode is held in a nonvolatile memory, and a code stream is formed based on the held information.

Those skilled in the art can easily understand that code stream generation in the spatial mode is relatively simple processing because a code stream can be formed for each macro block. On the other hand, processing in the frequency mode takes a longer time because a code stream can be formed only after the entire tile has been encoded. However, the latter method allows display of a reduced image at the initial stage of decoding/reproduction. It is therefore possible to heighten the value of the application.

Since the frequency mode or spatial mode is uniquely decided for one image, a file header stores information representing which mode is selected. The file header also stores information about a QP, prediction method, Huffman coding table, and the above stream conversion information SC, i.e., the execution count of distortion suppression processing. A tile header stores information representing the scanning direction in AC component prediction processing.

As described above, the larger the size of a captured image is, the more the stream conversion unit 102 executes block overlap processing (twice at maximum). This prevents an image reproduced at an intermediate resolution from including noticeable block noise, and enables to reproduce a high-quality image. If the size of a captured image is L or more, a generated code stream has a data structure in the frequency mode. This makes it possible to decode images at not only the original resolution (4000×3000 pixels in the embodiment) but also intermediate resolutions (1000×750 pixels and about 250×190 pixels in this embodiment) lower than the original resolution. That is, it is possible to directly decode encoded data files into images with three different resolutions including the resolution of the original image without through processing with a heavy load such as thinning processing.

[Explanation of Storage Device]

Figure 20:
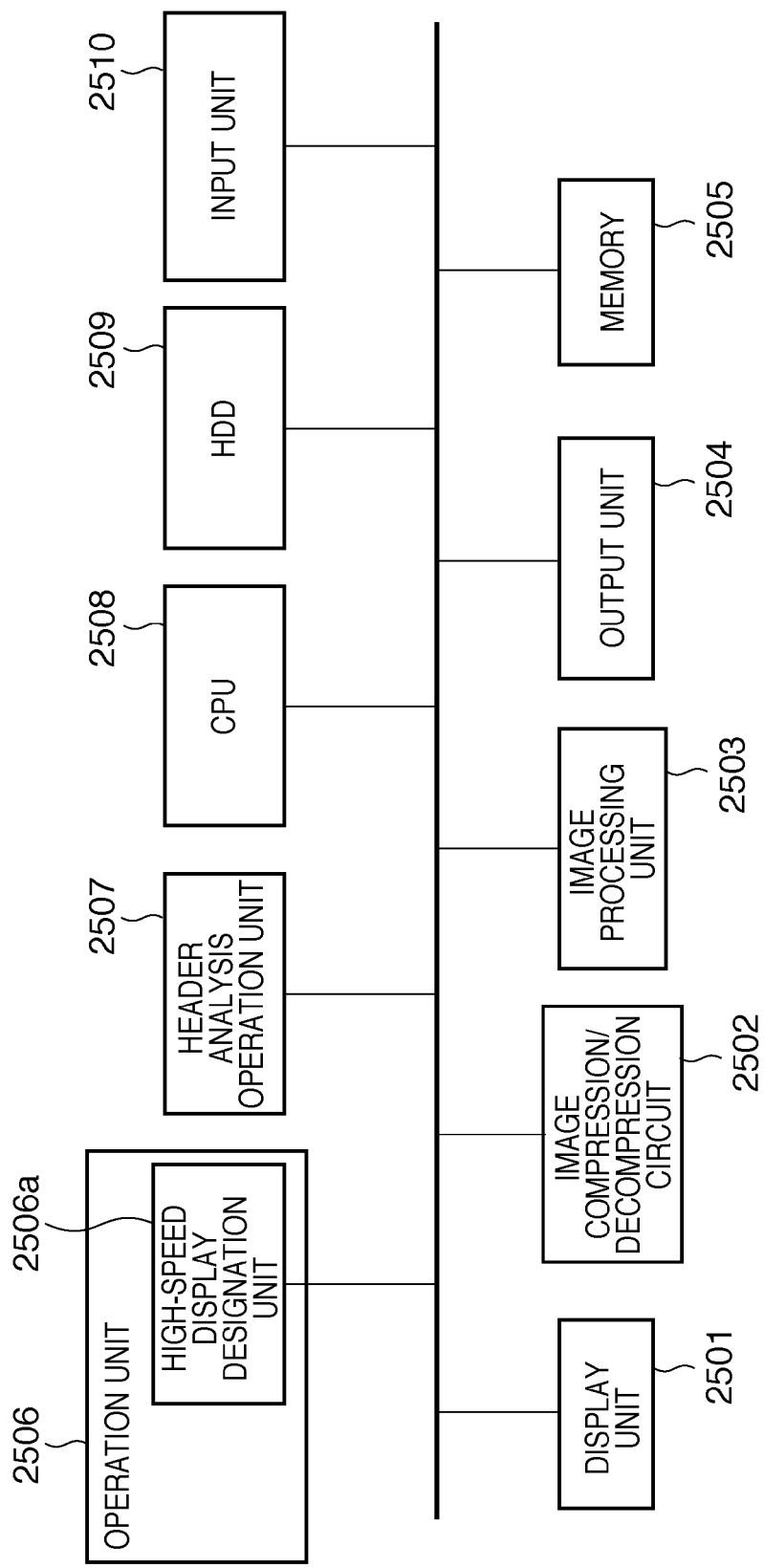
FIG. 20 is a block diagram of a storage device.

The arrangement of a storage device which stores image data captured and encoded by the above digital camera and the processing contents thereof will be described next with reference to FIG. 20. This storage device is, for example, an HDD recorder, which stores and manages image data files captured and encoded by the digital camera, and also has a function of displaying/outputting the images. The storage device includes a display unit 2501, an image compression/decompression unit 2502, an image processing unit 2503, an output unit 2504, a memory 2505, an operation unit 2506, a header analysis operation unit 2507, a CPU 2508, an HDD 2509, and an input unit 2510. In this case, the input unit 2510 is an interface which communicates with the above digital camera or a card reader in which a memory card removed from the digital camera is set. The HDD 2509 stores image data input from the input unit 2510. The operation unit 2506 includes various kinds of switches and operation buttons, one of which is a high-speed display designation unit 2506a.

Figure 21:
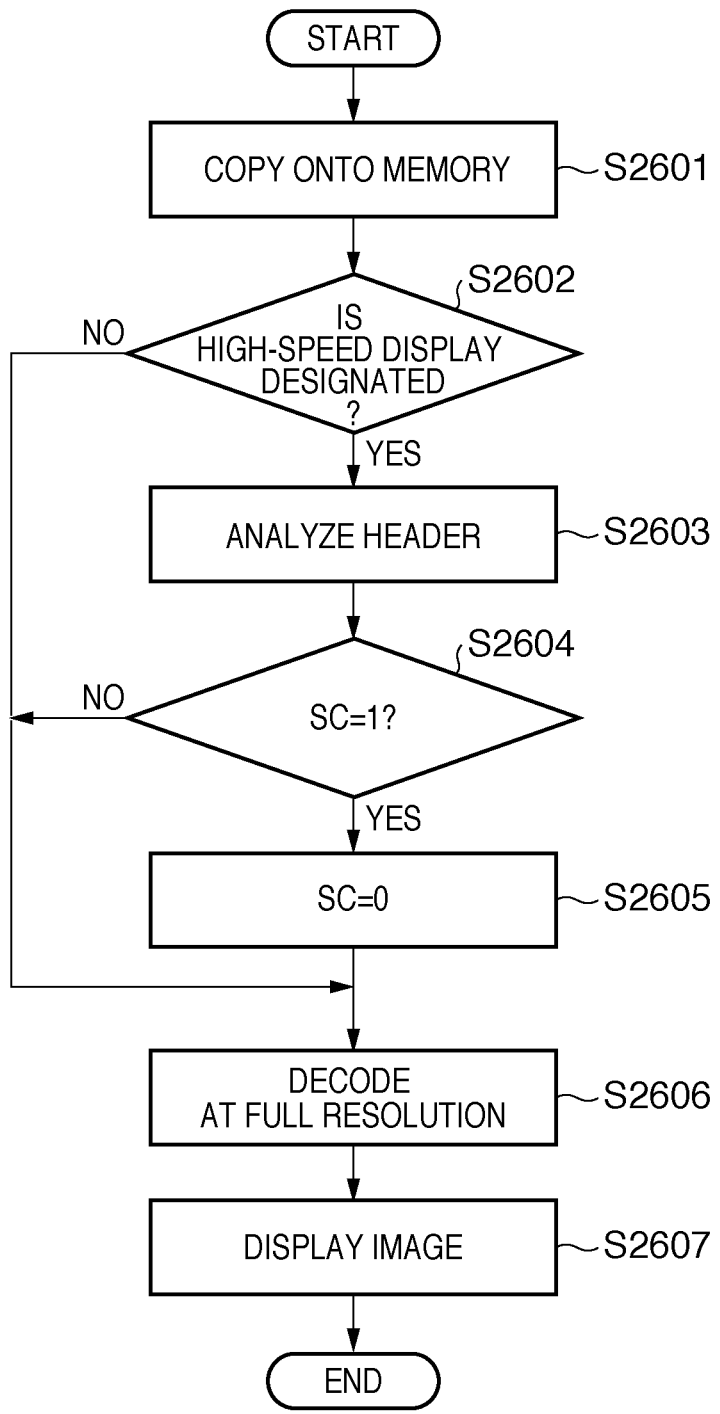
FIG. 21 is a flowchart for the storage device.

The processing procedure to be performed by the CPU 2508 when the user issues an image decode instruction (reproduction instruction) via the operation unit 2506 will be described with reference to the flowchart of FIG. 21.

When the user issues an image decode instruction, the CPU 2508 copies encoded image data to be decoded from the HDD 2509 onto the memory 2505 (step S2601). The CPU 2508 then determines whether the high-speed display designation unit 2506a has issued a high-speed display (high-speed decode) instruction (step S2602). If the high-speed display designation unit 2506a has issued no high-speed display instruction (NO in step S2602), the image compression/decompression unit 2502 decodes the image in an ordinary manner (step S2606). Assume that in this case, the image compression/decompression unit 2502 decodes the image at the same resolution as that of the original image. If YES in step S2602, the CPU 2508 analyzes the file header of the encoded image data to be decoded (step S2603). The CPU 2508 then extracts the stream conversion information SC in the header and determines whether the information SC is 1 (step S2604). If the information SC is not 1 (i.e., is 0 or 2), the CPU 2508 supplies the encoded image data to the image compression/decompression unit 2502 in an ordinary manner to make it decode the data (step S2606). If the information SC is 1 (YES in step S2604), the CPU 2508 rewrites the information SC in the header with "0" (step S2605). The CPU 2508 then supplies the encoded image data including the header whose information has been changed to the image compression/decompression unit 2502 to make it decode the data (step S2606). The display unit 2501 displays the decoded image (step S2607).

The image compression/decompression unit 2502 includes a compression unit and a decompression unit. The compression unit is the same as that in the digital camera described above, and hence the arrangement of the decompression unit (decoding processing unit) and the processing contents thereof will be described below.

As shown FIG. 1B, the decompression unit of the image compression/decompression unit 2502 includes a decoding information acquisition unit 2101, an entropy decoding unit 2102, a coefficient expansion unit 2103, a coefficient inverse prediction unit 2104, an inverse quantizing unit 2105, an inverse stream conversion unit 2106, and an inverse color conversion unit 2107.

When a code stream is input to the decoding information acquisition unit 2101, the header information in the code stream is analyzed. This analysis processing acquires information associated with encoding conditions such as FLEXBITS information, code stream order information (frequency/spatial), quantization parameter information and an overlap processing count (corresponding to the information SC in the first embodiment). The decoding information acquisition unit 2101 also receives information designating a code stream to be decoded (decoding target code stream decided in step S2503). The decoding information acquisition unit 2101 then outputs the designated code stream to the entropy decoding unit 2102 of the succeeding stage. That is, the decoding information acquisition unit 2101 outputs no information other than the designated code stream to the entropy decoding unit 2102.

The entropy decoding unit 2102 entropy-decodes the input code stream and outputs the decoding result to the coefficient expansion unit 2103. Since the coefficients have been rearranged by coefficient scanning at the time of encoding, the coefficient expansion unit 2103 performs inverse processing to restore the coefficients in the raster scanning order. The coefficient inverse prediction unit 2104 generates quantized indexes (quantized coefficients) by performing inverse calculation to the prediction calculation at the time of encoding based on the quantization step information and the like. The inverse quantizing unit 2105 generates coefficients by inversely quantizing the quantized indexes. The inverse stream conversion unit 2106 generates color-converted data by performing processing inverse to the flowchart of FIG. 3. The inverse color conversion unit 2107 generates a decoded image by performing inverse color conversion for the color-converted data.

As described above, in this embodiment, the data in a header is written. With this operation, when the information SC is 1, the embodiment skips the corresponding inverse overlap processing (1st Level inverse POT in FIG. 22B). This makes it possible to complete decoding processing within a short period of time, even though the decoded image differs in image quality from the original image.

[Second Embodiment]

The first embodiment has exemplified the method of decoding an image at full resolution. In practice, however, in some cases, an image is displayed at an intermediate resolution on the decoding side. The second embodiment will exemplify a decoding apparatus which performs processing including decoding an image at an intermediate resolution.

Assume that images up to the size LP (DC+ACDC components) are to be decoded. In this case, when an image has undergone POT twice at the time of encoding, it is possible to skip the second block distortion suppression processing. This makes it possible to speed up the decoding processing.

Figure 23:
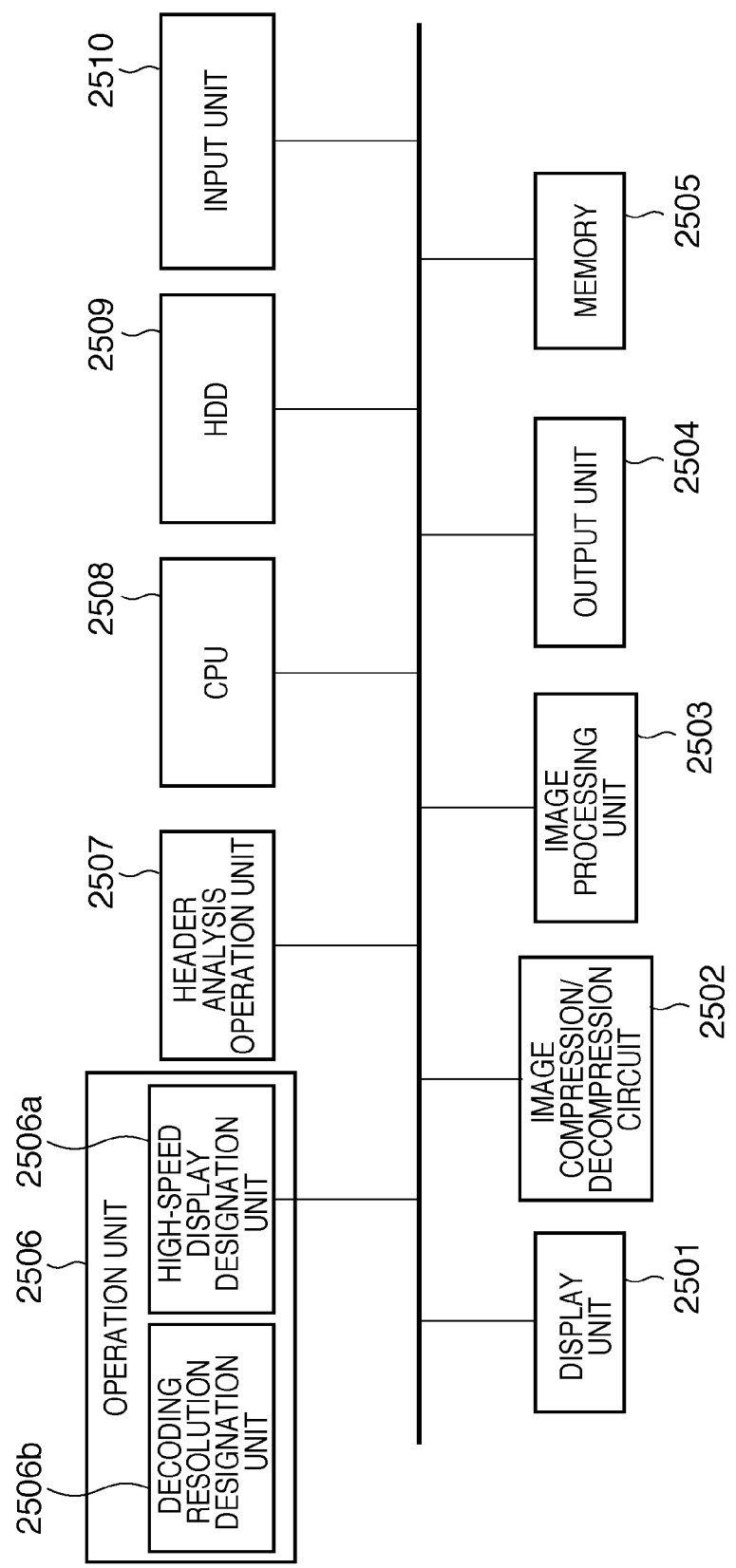
FIG. 23 is a block diagram of a storage device according to the second embodiment.
Figure 24:
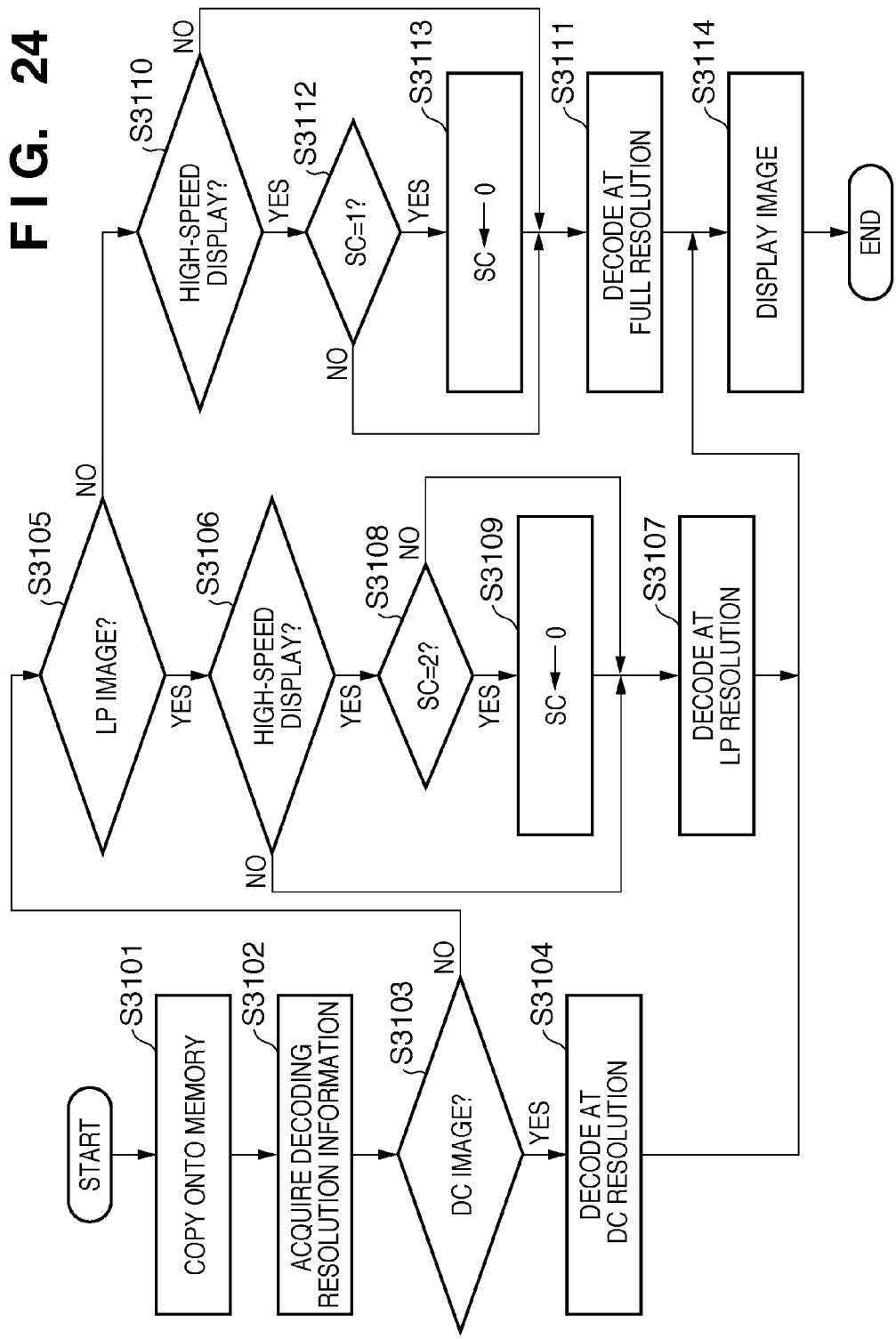
FIG. 24 is a flowchart for the processing of the storage device according to the second embodiment.

The second embodiment is based on the assumption of the use of a processing system similar to that in the first embodiment. As shown in FIG. 23, the system according to the second embodiment differs from that according to the first embodiment in that an operation unit 2506 includes a decoding resolution designation unit 2506b which designates a resolution at the time of reproduction (decoding), and in the processing contents. The decoding resolution designation unit 2506b designates one of three kinds of images, namely an image including only DC components of encoded image data (to be referred to as a DC image hereinafter), an image including only DC+ACDC components (to be referred to as an LP image hereinafter), and an image including all DC+ACDC+AC components (to be referred to as a full-resolution image hereinafter). The processing procedure of the CPU 2508 in the storage device according to the second embodiment will be described in accordance with the flowchart of FIG. 24.

When the user designates an image to be decoded via the operation unit 2506, the CPU 2508 copies the corresponding image in an HDD 2509 onto a memory 2505 (step S3101). The CPU 2508 further acquires the information of the resolution which is designated by the decoding resolution designation unit 2506b and at which the image should be decoded (step S3102). Assume that the user designates, as this resolution information, one of the resolutions of a DC image, LP image, and full-resolution image. If the resolution at which the image should be decoded corresponds to the resolution of a DC image (YES in step S3103), an image compression/decompression circuit 2502 decodes only DC components (step S3104).

If the image size to which the image should be decoded does not correspond to a DC image (NO in step S3103), the CPU 2508 determines whether the designated resolution corresponds to an LP image (step S3105). If the resolution corresponds to an LP image (YES in step S3105), the CPU 2508 determines whether high-speed display is designated via the high-speed display designation unit 2506a (step S3106). If high-speed display is not designated (NO in step S3106), the CPU 2508 decodes the DC components and the LP components (step S3107). If high-speed display is designated (YES in step S3106), the CPU 2508 determines whether the information SC in the header is 2 (step S3108). If the information SC is 2 (YES in step S3108), the CPU 2508 sets "0" (or "1") to the information SC for high-speed display (step S3109) and decodes the image (step S3107). If the information SC is not 2 (NO in step S3108), the CPU 2508 decodes the image without any change (step S3107). Note that even if the information SC in the header is "2", the same result is obtained regardless of whether the information SC is changed to "0" or "1". This is because only DC and ACDC components are decoded in step S3107.

Upon determining in step S3105 that the size to which the image should be decoded does not correspond to an LP image, i.e., the size corresponds to a full-size image (NO in step S3105), the CPU 2508 determines whether high-speed display is designated (step S3110). If high-speed display is not designated (NO in step S3110), the CPU 2508 decodes the image data at the full resolution (step S3111). If high-speed display is designated (YES in step S3110), the CPU 2508 determines whether the information SC in the header is 1

(step S3112). If the information SC is 1 (YES in step S3112), the CPU 2508 sets 0 in the information SC for high-speed display (step S3113), and decodes the image data (step S3111). If the information SC is not 1 (NO in step S3112), the CPU 2508 decodes the image data without any change (step S3111). The display unit 2501 then displays the generated decoded image (step S3114).

The second embodiment has exemplified the case in which the decoding processing is sped up for images having various resolutions.

[Third Embodiment]

The first and second embodiments each have exemplified the method of implementing high-speed processing by rewriting header information. In the third embodiment, the encoder side compresses an image upon setting the execution count of distortion correction processing (POT processing) to one of 0, 1, and 2. The decoder side implements high-speed decoding processing by internally switching on and off POT. Note that this embodiment is assumed to decode at the same resolution as that of an original image, and skips only 1st level inverse POT because skipping 2nd level inverse POT will greatly affect image quality.

Figure 25:
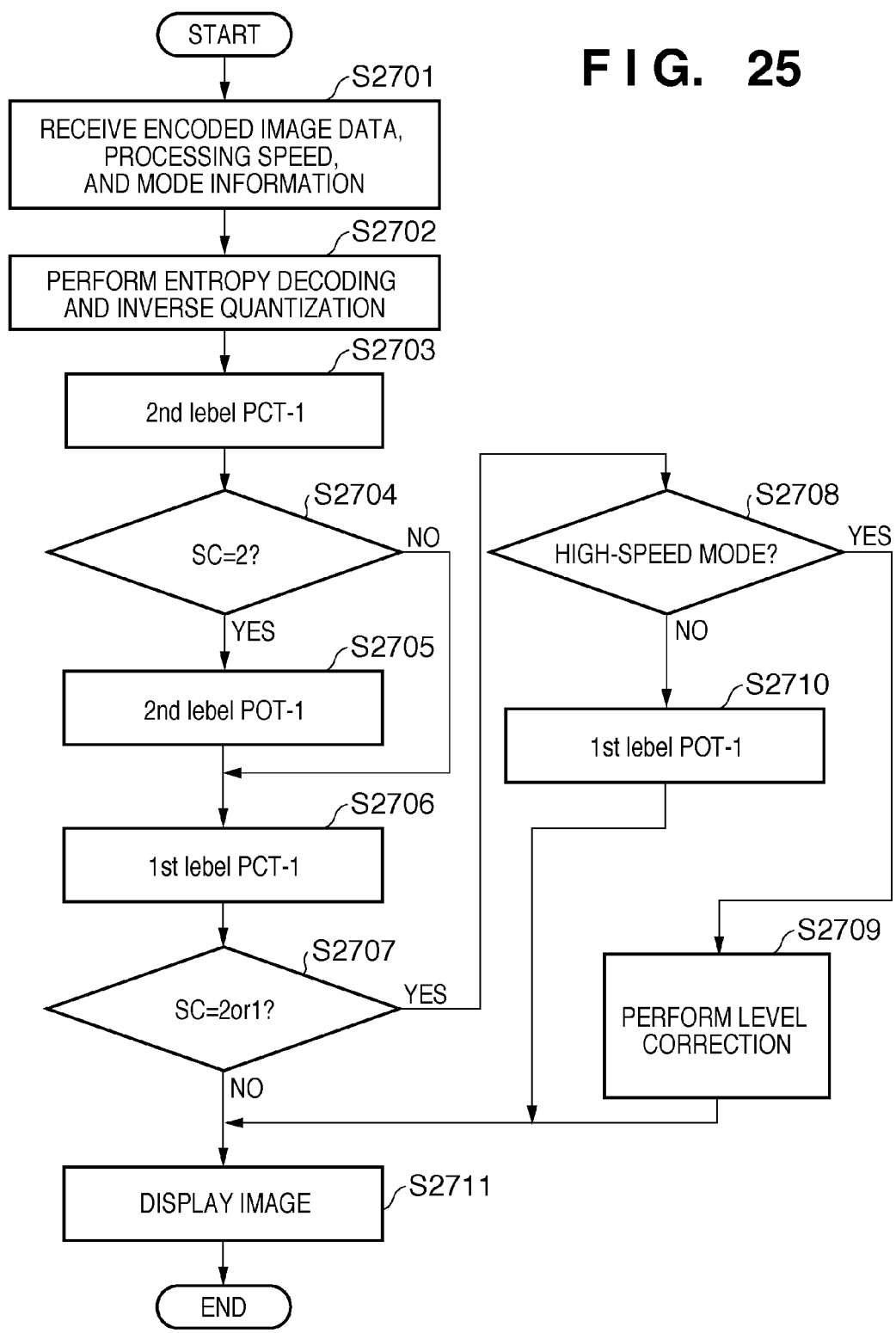
FIG. 25 is a flowchart illustrating the processing of a storage device according to the third embodiment.

Decoding processing is almost the same as that in the first embodiment, and hence a description of the processing will be omitted. In addition, a block diagram for decoding processing is almost the same as that in the first embodiment, and hence a description of the block diagram will be omitted. The processing procedure of a CPU 2208 of the storage device will be described below with reference to the flowchart of FIG. 25.

Upon acquiring encoded data and processing speed mode information indicating whether to perform high-speed reproduction/display (step S2701), the CPU 2208 performs entropy decoding and inverse quantization (step S2702). Subsequently, the CPU 2208 performs inverse frequency conversion for DC and ACDC components (step S2703). The CPU 2208 then determines whether stream conversion information SC is 2 (step S2704). If the information SC is 2 (YES in step S2704), the CPU 2208 performs inverse block overlap conversion processing (step S2705), and inverse frequency conversion (step S2706). If the stream conversion information SC is not 2 (NO in step S2704), the CPU 2208 performs inverse frequency conversion (step S2706). That is, the CPU 2208 performs processing in an ordinary manner up to step S2706 to reconstruct data immediately before first inverse block overlap processing. Upon completing step S2706, the CPU 2208 determines whether the stream conversion information SC is 2 or 1 (step S2707). If the information SC is neither 2 nor 1 (NO in step S2707), the CPU 2208 displays the decoded image without any change (step S2711).

If the stream conversion information SC is 2 or 1 (YES in step S2707), the CPU 2208 determines whether the highs-speed processing mode is designated (step S2708). If this mode is designated (YES in step S2708), the CPU 2208 performs level correction (step S2709), and displays the decoded image (step S2711). Note that "level correction" processing is performed for the following reason. When inverse POT processing (overlap processing) is performed, the dynamic range changes. If the image is displayed upon skipping the inverse processing for this reason, an image with an unnatural dynamic range is displayed. In the present invention, assuming that overlap processing changes the dynamic range α times, level correction is the processing of multiplying each coefficient by 1/α. Providing this level correction processing makes it possible to reduce the frequency of displaying unnatural images, even if inverse POT processing is omitted. If the high-speed mode is not set (NO in step S2708), the CPU 2208 performs inverse block overlap processing (step S2710), and displays the decoded image (step S2711).

As described above, the exemplified method is to increase the processing speed while suppressing image quality degradation as much as possible, when the stream conversion information SC is 1 or 2.

[Other Embodiments]

Note that the first and second embodiments each have exemplified the case in which no inverse block overlap processing is performed. However, the same level correction as that described in the third embodiment may also be performed in the first and second embodiments. In contrast, although the third embodiment has exemplified the method of outputting an image upon level correction processing, it is possible to omit level correction processing.

In addition, the third embodiment has exemplified the method of decoding an image with the same resolution as that of an original image. However, it is possible to decode an image at an intermediate resolution by decoding DC and ACDC components. Assume that block overlap processing is performed twice at the time of encoding, and an image is output and displayed by decoding only DC and ACDC components at the time of decoding. In this case, skipping inverse block overlap processing has a small influence on image quality. For this reason, it is possible to skip the processing. The present invention also incorporates a method of decoding upon skipping inverse block overlap processing when high-speed processing is required, and otherwise, decoding without skipping the processing.

The embodiment has exemplified the application of the image decoding apparatus to the storage device. However, the decoding unit inside the digital camera may include the storage device. That is, the present invention is not limited by the type of device in which the storage device is mounted.

The present invention also incorporates a method without any inverse block overlap processing as a method for a decoding apparatus which outputs/displays only decoded images constituted by DC and ACDC components and performs only high-speed processing. In addition, in the third embodiment, it is possible to perform block overlap processing at the time of encoding by using any one of "0", "1", and "2". However, some limitation may be imposed on this technique. For example, the present invention incorporates a method having no inverse block overlap processing unit on the decoder side, with the execution count of block overlap processing being limited to 0 and 1. Furthermore, the present invention incorporates a method which has only an inverse block overlap processing, on the decoder side, which performs inverse block overlap processing after inverse frequency conversion is performed twice, and is configured to skip the processing when high-speed processing is required, and not to skip the processing when high-speed processing is not required.

The above embodiments may be implemented by computer programs which cause a computer to execute the processing corresponding to each embodiment. Computer programs are normally stored in a computer-readable storage medium such as a CD-ROM. The computer programs become executable when they are copied or installed in a system by setting the storage medium in the read unit (e.g., CD-ROM drive) of a computer. Hence, the computer-readable storage medium is also incorporated in the present invention.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-143667, filed Jun. 16, 2009 which is hereby incorporated by reference herein in its entirety.

What is claimed is:

1. An image decoding apparatus which decodes encoded image data encoded by an encoding method configured to designate whether to perform distortion suppression processing of suppressing block distortion before each of two times of frequency conversion, the apparatus comprising:
   a decoding unit which decodes target encoded image data based on information included in a header of the target encoded image data;
   a designation unit which designates whether to perform high-speed decoding;
   an analysis unit which analyzes a header of the target encoded image data and extracts parameter information associated with the distortion suppression processing; and
   a header information changing unit which rewrites the parameter information in the header with information indicating no execution of the distortion suppression processing and supplies the target encoded image data including the rewritten header to said decoding unit when the parameter information obtained by said analysis unit indicates that the distortion suppression processing has been performed only before first frequency conversion and said designation unit has designated high-speed decoding.

2. The apparatus according to claim 1, wherein said header information changing unit updates a copied header of encoded original image data.

3. The apparatus according to claim 1, further comprising a size designation unit which designates reproduction of any one of images having sizes including a DC image constituted by only DC components obtained by second frequency conversion at the time of encoding, an LP image constituted by only DC components and AC components obtained by second frequency conversion, and a full-resolution image constituted by all components obtained by first frequency conversion and second frequency conversion,
   wherein said header information changing unit rewrites the parameter information when said designation unit designates high-speed decoding and said size designation unit designates one of the LP image and the full-resolution image.

4. An image decoding apparatus which decodes encoded image data encoded by an encoding method configured to designate whether to perform distortion suppression processing of suppressing block distortion before each of two times of frequency conversion, the apparatus comprising:
   a decoding unit which decodes target encoded image data based on information included in a header of the target encoded image data;
   a processing unit which reconstructs data up to immediately before first frequency conversion based on a decoding result obtained by said decoding unit;
   a designation unit which designates whether to perform high-speed decoding;
   an analysis unit which analyzes a header of decoding target encoded image data and extracts parameter information associated with the distortion suppression processing; and
   a control unit which executes the distortion suppression processing for data obtained by said processing unit and displays the obtained data as image data when the parameter information obtained by said analysis unit indicates that the distortion suppression processing has been performed before first frequency conversion and said designation unit has not designated high-speed decoding,
   displays data obtained by said processing unit without performing the distortion suppression processing when the parameter information obtained by said analysis unit indicates that the distortion suppression processing has been performed before first frequency conversion and said designation unit has designated high-speed decoding, and
   displays data obtained by said processing unit as image data when the parameter information obtained by said analysis unit indicates that the distortion suppression processing has not been performed before first frequency conversion.

5. The apparatus according to claim 4, wherein, when the parameter information obtained by said analysis unit indicates that the distortion suppression processing has been performed before first frequency conversion and said designation unit has designated high-speed decoding, level correction processing simpler than the distortion suppression processing is performed for data obtained by said processing unit and obtained data is displayed as image data.

6. A control method for an image decoding apparatus which decodes encoded image data encoded by an encoding method configured to designate whether to perform distortion suppression processing of suppressing block distortion before each of two times of frequency conversion, the method comprising steps of:
   causing a decoding unit to decode target encoded image data based on information included in a header of the target encoded image data;
   causing a designation unit to designate whether to perform high-speed decoding;
   causing an analysis unit to analyze a header of the target encoded image data and extracts parameter information associated with the distortion suppression processing; and
   causing a header information changing unit to rewrite the parameter information in the header with information indicating no execution of the distortion suppression processing and supplies the target encoded image data including the rewritten header to the decoding step when the parameter information obtained in the analyzing step indicates that the distortion suppression processing has been performed only before first frequency conversion and high-speed decoding has been designated in the designating step.

7. A control method for an image decoding apparatus which decodes encoded image data encoded by an encoding method configured to designate whether to perform distortion suppression processing of suppressing block distortion before each of two times of frequency conversion, the method comprising steps of:
- causing a decoding unit to decode target encoded image data based on information included in a header of the target encoded image data;
- causing a processing unit to reconstruct data up to immediately before first frequency conversion based on a decoding result obtained in the decoding step;
- causing a designation unit to designate whether to perform high-speed decoding;
- causing an analysis unit to analyze a header of a decoding target encoded image data and extracts parameter information associated with the distortion suppression processing; and
- causing a control unit to execute the distortion suppression processing for data obtained in the processing step and displays the obtained data as image data when the parameter information obtained in the analyzing step indicates that the distortion suppression processing has been performed before first frequency conversion and high-speed decoding has not been designated in the designating step,
- execute level correction processing simpler than the distortion suppression processing for data obtained in the processing step and display obtained data as image data when the parameter information obtained in the analyzing step indicates that the distortion suppression processing has been performed before first frequency conversion and high-speed decoding has been designated in the designating step, and
- display data obtained in the processing step as image data when the parameter information obtained in the analyzing step indicates that the distortion suppression processing has not been performed before first frequency conversion.

8. A non-transitory computer-readable storage medium storing a computer program which, when executed by a computer, causes the computer to perform the steps in the method according to claim 6.

* * * * *